(12) United States Patent
Toda et al.

(10) Patent No.: US 6,246,054 B1
(45) Date of Patent: Jun. 12, 2001

(54) SCANNING PROBE MICROSCOPE SUITABLE FOR OBSERVING THE SIDEWALLS OF STEPS IN A SPECIMEN AND MEASURING THE TILT ANGLE OF THE SIDEWALLS

(75) Inventors: Akitoshi Toda, Kunitachi; Shuzo Mishima, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/092,285

(22) Filed: Jun. 5, 1998

(30) Foreign Application Priority Data

| Jun. 10, 1997 | (JP) | 9-152242 |
| Jul. 16, 1997 | (JP) | 9-191316 |
| Jun. 1, 1998 | (JP) | 10-151357 |

(51) Int. Cl.⁷ ................................................. H01J 37/26
(52) U.S. Cl. .................................................... 250/306
(58) Field of Search .................................... 250/306, 307

(56) References Cited

U.S. PATENT DOCUMENTS

| 5,051,379 | 9/1991 | Bayer et al. |
| 5,239,863 | * 8/1993 | Kado et al. ............... 250/306 |
| 5,242,541 | 9/1993 | Bayer et al. |
| 5,283,442 | 2/1994 | Martin et al. |
| 5,347,854 | 9/1994 | Martin et al. |
| 5,382,795 | 1/1995 | Bayer et al. |
| 5,399,232 | 3/1995 | Albrecht et al. |
| 5,412,980 | 5/1995 | Elings et al. |
| 5,519,212 | 5/1996 | Elings et al. |
| 5,611,942 | * 3/1997 | Mitsui et al. ............... 250/306 |
| 5,729,026 | * 3/1998 | Mamin et al. ............... 250/306 |
| 5,744,799 | * 4/1998 | Ohara ....................... 250/306 |
| 6,011,261 | * 1/2000 | Ikeda et al. ................ 250/306 |

FOREIGN PATENT DOCUMENTS

| 1-262403 | 10/1989 | (JP) . |
| 3-104136 | 5/1991 | (JP) . |
| 6-194154 | 7/1994 | (JP) . |
| 7-270434 | 10/1995 | (JP) . |
| 2501282 | 3/1996 | (JP) . |

OTHER PUBLICATIONS

T. R. Albrecht et al, "Atomic Resolution with Atomic Force Microscope", (1987), pp. 1281–1286, vol. 3(12) Europhysics Letters.

Yves Martin et al, "Method for imaging sidewalls by atomic force microscopy", (1994), pp. 2498–2500, vol. 64(19), App. Phys. Lett., American Institute of Physics.

Extended Abstracts (55th Applied Physics Society Meeting, Fall of 1994) p. 473, 22p–Q–1, The Japan Society of Applied Physics.

* cited by examiner

Primary Examiner—Kiet T. Nguyen
(74) Attorney, Agent, or Firm—Frishauf, Holtz, Goodman, Langer & Chick, P.C.

(57) ABSTRACT

A probe chip suitable for observing the vertical walls of steps in a specimen includes a cantilever-like elastic member section extending from a support section, and a probe section at the free end of the elastic member section. The probe section is in the form of a triangular flat plate. Three ridges are terminated at two vertexes at the tip of the probe section. The direction normal to the plane of the probe section section is parallel to the ridge connecting the two points at the tip. These two terminal points at the tip of the probe section act as a virtual probe and interact with the surface of the specimen. The direction normal to the plane of the elastic member section is nonparallel to the direction normal to the plane of the probe section.

28 Claims, 15 Drawing Sheets

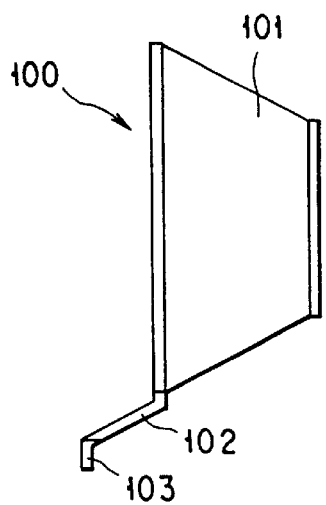
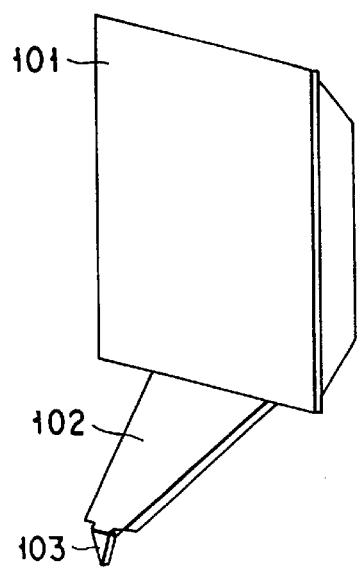
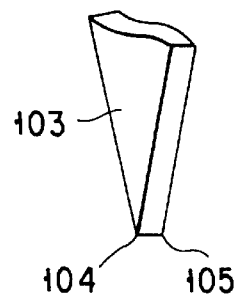
FIG. 1A
FIG. 1B
FIG. 1C
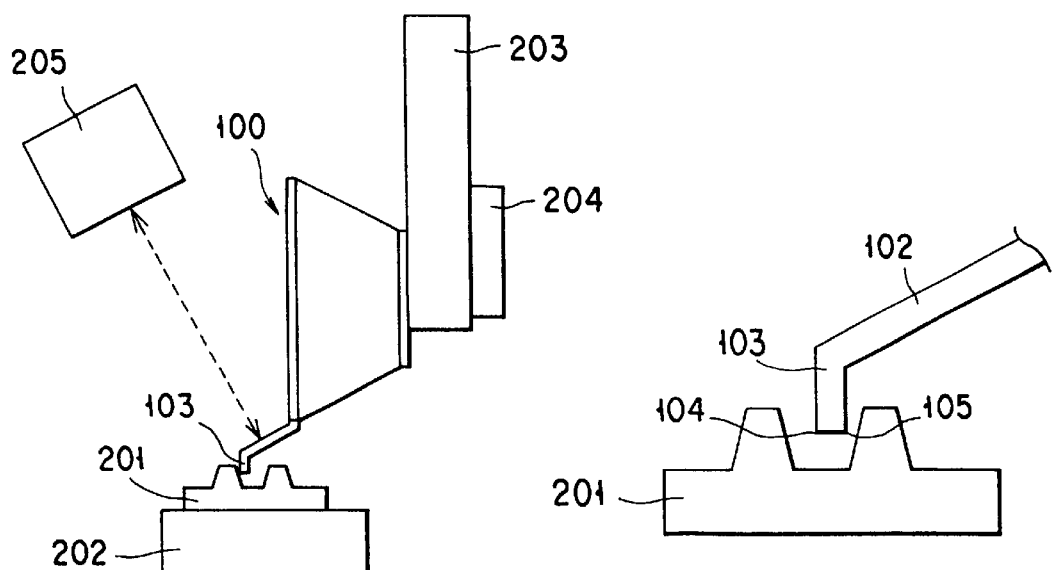
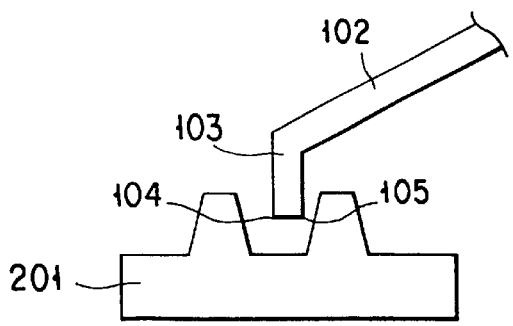
FIG. 2A
FIG. 2B

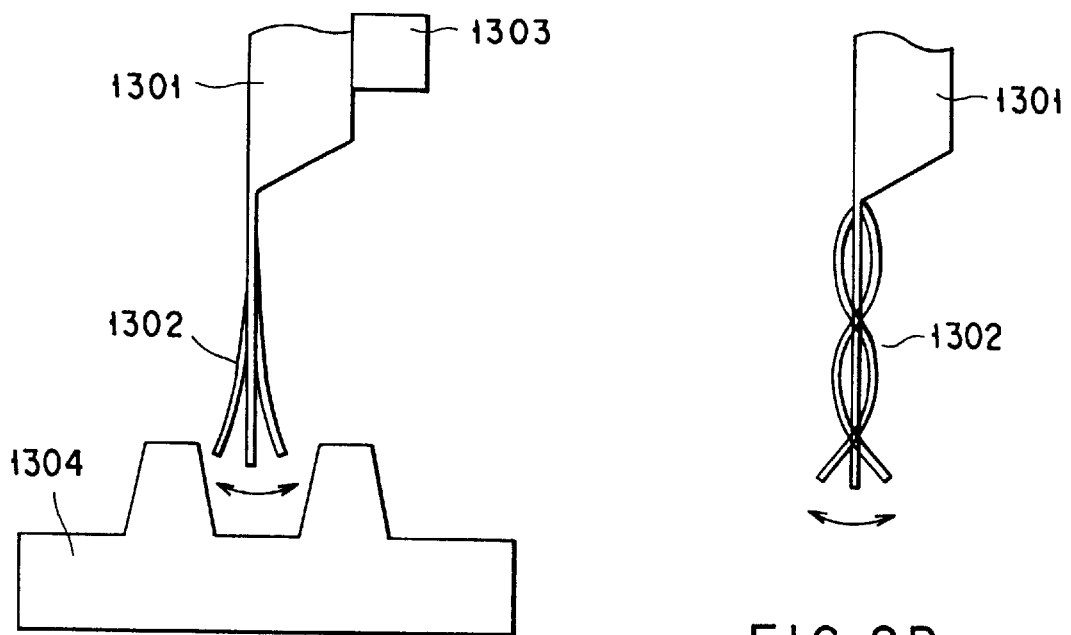
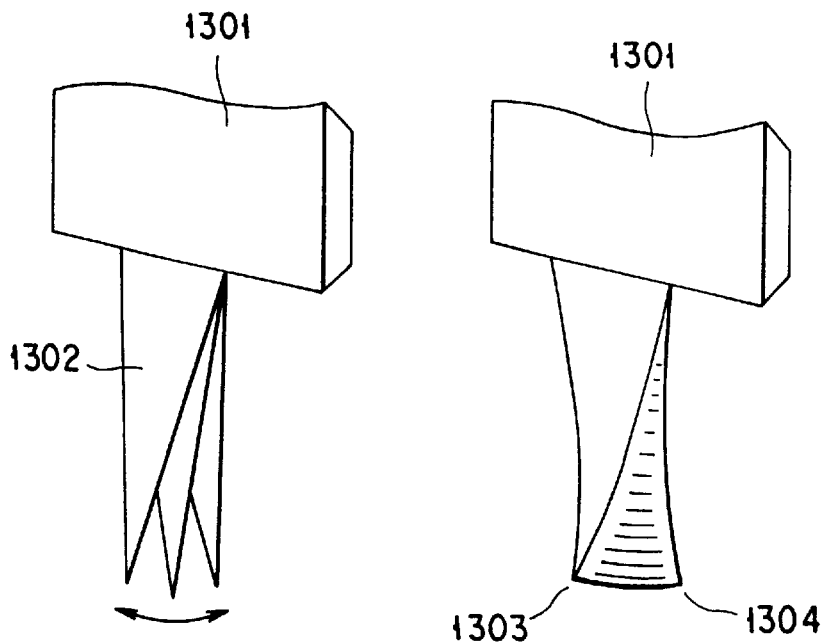
FIG. 8A  FIG. 8B  FIG. 8C  FIG. 8D

SCANNING PROBE MICROSCOPE SUITABLE FOR OBSERVING THE SIDEWALLS OF STEPS IN A SPECIMEN AND MEASURING THE TILT ANGLE OF THE SIDEWALLS

BACKGROUND OF THE INVENTION

This invention relates to a scanning probe microscope for observing the surface geometry of a specimen, and more particularly to a scanning probe microscope suitable for measuring the roughness and tilt angle of the sidewall of a step in an IC semiconductor, for example, the sidewall of an electrode line pattern.

A scanning probe microscope (SPM) is an instrument that brings a probe as close as less than 1 μm to the surface of a specimen, scans in the directions of X and Y or of X, Y, and Z while sensing the interaction between the probe and the specimen, and provides a two-dimensional mapping of the interaction. The scanning probe microscope (SPM) is the generic name for the scanning tunneling microscope (STM), the interatomic force microscope (AFM), the magnetic force microscope (MFM), the scanning near-field optical microscope (SNOM), etc. Of these, the AFM is the most widely used type of SPM as an instrument for acquiring information on the unevenness of the surface of a specimen. The AFM indirectly acquires information on the unevenness of the surface of a specimen by sensing the displacement of a cantilever caused by the force acting on a probe when the probe (a projection) formed at the tip of the cantilever is brought closer to the surface of the specimen.

The probe used for the AFM is produced using semiconductor processes, batch fabrication techniques, because of advantages in performance and cost. For example, what is called a flat lever produced by patterning a silicon oxide thin film has been reported in T. R. Albrecht et al., "Atomic Resolution with Atomic Force Microscopy," Europhys. Lett., 3(12), pp. 1281–1286, 1987. A bird's beak-type probe chip, an improved version of the flat lever, has been disclosed in Jpn. Pat. Appln. KOKAI Publication No. 1-262403. The silicon nitride probe chip with a pyramidal probe disclosed in U.S. Pat. No. 5,399,232 and the silicon probe chip disclosed in U.S. Pat. No. 5,051,379 have already been commercialized and available on the market. Such a probe chip uses the projection point-terminated at the tip of the probe as a virtual probe, with the vertical angle of the probe in the range from 15° to 90° in view of the whole probe.

As for semiconductor IC design rules, trial products of 256-MB storage device adhering to the 0.25 μm rules have been developed and the 0.15 μm rules are going to be applied to one-GB storage devices. Such being the case, the element geometry inspecting machine is required to accurately measure the width of narrow lines of an element with a large aspect ratio and the entire geometry. Because scanning probe microscopes are suitable for such geometry measurement, they have been under intensive study.

In Yyes Martin and H. Kumar Wickramasinghe, "Method for imaging sidewalls by atomic force microscopy," Apply. Phys. Lett. Vol. 64(19), pp. 2489–2500, 1994, a new scanning probe microscope that images vertical walls have been proposed. A patent related to this has been disclosed in Japanese Patent No. 2,501,282. With the scanning probe microscope, use of a boot-type probe (i.e., a cylindrical probe whose body is narrow near the tip) enables the measurement of the vertical wall of a specimen. Unlike the aforementioned point-terminated probe, such a probe allows different points at the flare portion of the tip to interact with the sidewalls on both sides of the recessed portion. Namely, the boot-type probe has at least two or more virtual probes at the tip, which makes the vertical angle of the virtual probe 0° or less.

A probe of the boot type is composed of a portion 2 μm to 2.5 μm in diameter on the cantilever side (a thick portion) and a thin portion connected to the tip of the thick portion. The thin portion is shaped like a boot. The boot-shaped portion has a length (height) of 2.8 μm, the probe at the tip has a diameter of 360 nm at the flare section, and the narrow portion closer to the cantilever has a diameter of 210 nm.

When the sidewalls of a trench or a hole in a semiconductor are measured using the probe chip, it is the flare section that comes closest to the surface of the specimen (sidewalls), since the flare section at the tip of the probe projects. The roughness or tilt angle of the sidewall can be measured by causing the probe to scan the specimen while keeping the spacing between the projecting portion of the probe and the surface of the specimen constant.

Jpn. Pat. Appln. KOKAI Publication No. 3-104136 has disclosed a method of producing such a boot-type probe. The probe is produced by photolithography using a monocrystalline silicon wafer as a start wafer. After a circular mask with a diameter of about 1 μm or less has been formed, the silicon wafer is dug almost vertically by dry etching with CF4 gas to form a semi-cylindrical silicon probe section. Changing the conditions for dry etching makes the semi-cylindrical probe section thicker or thinner in the middle of the cylinder. Suitably selecting the conditions produces a monocrystalline semi-cylindrical probe thinner in the middle. Thereafter, the probe section is protected with resist or the like. The patterning of the cantilever is achieved, followed by etching from the reverse side of the wafer. This produces a probe chip with a boot-type probe.

The probe of the AFM probe chip, however, can permit the tip of the probe to wear or break because it is in contact with the surface of the specimen during measurement (scanning). Attention should be given to a material for the probe to make stable AFM measurements. For example, Matsuyama, et al., gave a presentation on wear of probe materials in an academic lecture in the 55th Applied Physics Society Meeting (proceedings p. 473). They reported that monocrystalline silicon and silicon nitride were widely used materials, comparison between them showed that a silicon nitride film wears less than a monocrystalline silicon film, and a silicon nitride film with a silicon-nitride stoichiometry of 3:4 wears still less among silicon nitride films.

Not to mention a scanning probe microscope that images vertical walls by Yves Martin, et al., even usual scanning probe microscopes need a probe whose vertical angle is small and whose aspect ratio is high to measure the root of the sidewall of a specimen with a high aspect ratio as accurately as possible.

A scanning probe microscopy of imaging vertical walls by Yves Martin, et al., described in Apply. Phys. Lett. Vol. 64(19), pp. 2489–2500, 1994, is a method using noncontact mode AFM. During measurement in the air, the probe sometimes comes into contact with the surface of the specimen. Specifically, although the noncontact mode AFM measuring method is used, the finite band of the feedback circuit in the system makes it difficult to measure a specimen with great irregularities or a specimen with steps without allowing the probe to touch the specimen at all. The difficulty of measuring vertical walls by the complete noncontact mode AFM measuring method can be inferred from the fact that Yves Martin, et al., authors of the thesis, have disclosed in Jpn. Pat. Appln. KOKAI Publication No. 6-19415 a method of measuring the sidewalls of a specimen with similar steps by a contact mode AFM method with the probe being excited and from the fact that Virgil B. Elings, et al., has disclosed in Jpn. Pat. Appln. KOKAI Publication No. 7-270434 a microscope capable of measuring sidewalls by a contact mode AFM method with the probe being exited.

When the probe comes into contact with the specimen, this possibly permits the probe to wear or break, changing the shape of the probe during the measurement. Because the scanning probe microscopy of imaging vertical walls by Yves Martin, et al., is used to measure the shapes of electron patterns of semiconductor ICs complying with submicron pattern rules as described above, even when the probe has worn and its shape has changed as little as several tens of nanometers, the measurement result changes 10% or more. Therefore, the change of the shape of the probe due to wear becomes a very serious problem. In general, measuring devices are required to have a high reproducibility. When the scanning probe microscope that images vertical walls by Yves Martin, et al., is considered in terms of measuring devices, the fact that wear of the probe will ruin the reproducibility of measurement data is a very serious problem.

To assure the reproducibility of data, frequent correction of the shape of the probe can be considered. Frequent correction of the probe before measurement of a specimen raises a problem in terms of throughput required of measuring devices. The reason is that the number of specimens that can be measured during a unit time decreases because of correction work. If a correction method of measuring a correction specimen by the same method as in measurement is used for correction, the probe can wear during correction work and its shape change. Therefore, too frequent correction work would cause a problem.

Furthermore, the flare portion projects from the tip of the boot-type probe for use with a scanning probe microscope that images vertical walls, which has been disclosed by Yves Martin, et al. The projection permits at least two virtual probes to exist, but it is difficult to determine which part of the flare portion is interacting with the specimen.

Furthermore, a probe used in the scanning probe microscopy that images vertical walls written in the thesis by Yves Martin, et al., is formed by etching a monocrystalline silicon as disclosed in Jpn. Pat. Appln. KOKAI Publication No. 3-104136. As described above, silicon is a material liable to wear. Wear is a serious problem in terms of probe material.

To form a monocrystalline silicon boot-shaped probe disclosed in Apply. Phys. Lett. Vol. 64(19). pp. 2489–2500, 1994 or Jpn. Pat. Appln. KOKAI Publication No. 3-104136, dry etching has been used. In general, when dry etching is used for submicron patterning, a slight change in the formation conditions causes the problem of changing the shape of the probe.

To measure a specimen of the submicron order, it is necessary to use a probe narrower than that dimension. It is quite difficult to form such a probe with good uniformity. The shape varies depending on not only the wafer but also the place in one wafer. From this, it can be understood easily how difficult it is to form a probe narrower than dimensions of the submicron order using a machine similar to a dry etching machine for manufacturing semiconductor ICs adhering to pattern rules of the submicron order.

Variations in the shape (dimensions) of the probe lead to a rise in the cost of manufacturing probes, which becomes a serious problem. Specifically, to measure the submicroscopic irregularities in a specimen, it is necessary to examine the probes carefully before shipment whether each probe is finished to dimensions smaller than at least the design dimensions. This raises the inspection cost. Variations in the shape of the probe, of course, lowers the yield considerably, resulting in a further rise in the cost.

BRIEF SUMMARY OF THE INVENTION

It is a general object of the present invention to provide a scanning probe microscope suitable for observing the sidewalls of steps in a specimen or measuring the tilt angle of the sidewalls.

It is a more specific object of the present invention to provide a new probe chip suitable for the above object, a method of manufacturing the probe chip, and a holding mechanism suitable for the probe chip.

Another specific object of the present invention is to provide a new scanning probe microscopy suitable for the above objects and a new probe chip for the scanning probe microscopy.

Additional objects and advantages of the invention will be set forth in description which follows, and in part will be obvious from the description, or may be learned by practice of the invention. The objects and advantages of the invention may be realized and obtained particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a side view of a probe chip for a scanning probe microscope according to an embodiment of the present invention;

FIG. 1B is a perspective view of the probe chip of FIG. 1A;

FIG. 1C is an enlarged perspective view of the probe section of the probe chip in FIG. 1B;

FIG. 2A shows the state where the probe chip for a scanning probe microscope shown in FIGS. 1A to 1C is in the course of measurement;

FIG. 2B is an enlarged view of the probe chip of FIG. 2A and its vicinities;

FIG. 8A shows how the probe chip shown in FIGS. 6A to 6C vibrates in the basic mode;

FIG. 8B shows how the probe chip shown in FIGS. 6A to 6C vibrates in a high-degree mode;

FIG. 8C is a momentary view of the vibrating cantilever of the probe chip shown in FIGS. 6A to 6C;

FIG. 8D is a view of the vibrating cantilever of the probe chip shown in FIGS. 6A to 6C during a time interval of one period or more;

DETAILED DESCRIPTION OF THE INVENTION

Figure 3A:
FIGS. 3A to 3E show a series of processes for producing a probe chip shown in FIGS. 1A to 1C.

A probe chip 100 for scanning probe microscopes suitable for observing the sidewalls of steps in a specimen or measuring the tilt angle of the sidewalls will be explained.

As shown in FIGS. 1A and 1B, a cantilever or elastic member section 102 made of an elastic material extends from a support section 101. A probe section 103 is formed at the free end of the cantilever. As shown in FIG. 1C, the probe section 103 is in the form of a triangular flat plate. Three ridges are terminated at two vertexes 104 and 105 at the tip of the probe section. The direction normal to the plane of the flat-plate triangular probe section 103 is almost parallel to the ridge connecting the two points 104 and 105 at the tip. The two terminal points or projections 104 and 105 at the tip of the probe section 103 mainly function as a virtual probe capable of determining a position on the specimen and interact with the surface of a specimen, especially the surface of the sidewalls in a specimen. Namely, two points of application capable of determining a position on the specimen exist at the tip of the probe section 103. Depending on the specimen, a certain point on the ridge connecting the terminal points 104 and 105 may act as a point of application. For example, this will take place when a certain point on the ridge is closer to the surface of the specimen than the terminal points 104 and 105. When the sidewalls in the specimen are measured, however, any point on the ridge will not act as a point of application and one of the two terminal points 104 and 105 will act as a point of application. In this respect, the probe chip of the present embodiment differs from the probe chips disclosed in Europhys. Lett. 2, p. 1281, 1986 and Jpn. Pat. Appln. KOKAI Publication No. 1-262403.

The direction normal to the plane of the cantilever-like elastic member section 102 is nonparallel to the direction normal to the plane of the flat-plate triangular probe section 103. The cantilever 102 is in the form of a bent shape. In this respect, the probe chip of the embodiment differs from the probe chip disclosed in Europhys. Lett. 2, p. 1281, 1987.

Typical dimensions of the probe chip of the embodiment are as follows: the rectangular cantilever 102 has a length of 70 $\mu$m, a width of 40 $\mu$m, and a thickness of 0.6 $\mu$m, and the probe section 103 has a height of 15 $\mu$m.

As shown in FIG. 2A, the probe chip 100 is fixed to a probe chip holding member 203. A piezoelectric element 204 is fastened to the probe chip holding member 203. Being powered by alternating-current voltage from a driving circuit (not shown), the piezoelectric element 204 excites the elastic member section 102 of the probe chip 100 at a frequency near the resonance frequency. As a result, the elastic member section 102 of the probe chip 100 is excited.

The probe chip 100 fixed to the probe chip holding member section 203 is arranged so that the probe section 103 may be perpendicular to the primary surface of the specimen 201. The specimen 201 is placed on a stage 202 that can scan the specimen in the direction of X, Y, and Z. During measurement, the specimen 201 is scanned in the directions of X, Y, and Z. The vibration of the elastic member section 102 of the probe chip 100 is monitored by a displacement sensor 205.

As shown in FIG. 2B, the probe section 103 is inserted between two projections of the specimen 201. Of the two terminal points 104 and 105 at the probe section 103, the one closer to the sidewall of the projection of the specimen 201 acts on the sidewall as a virtual probe. As a result, interaction takes place between the probe and the specimen. A point on the ridge connecting the terminal points 104 and 105 acts on the opposite surface, the bottom surface between the two projections between which the probe section 103 has been inserted, as a virtual probe and interacts with the surface.

In the example of FIG. 2B, the terminal point 105 acts on the sidewall of the right-side projection of the probe section 103 as a virtual probe, whereas the terminal point 104 acts on the left-side projection as a virtual probe. While the specimen 201 is being scanned in the directions of X, Y, and Z, feedback control is effected so that the vibration of the elastic member section 102 may be kept stable. By monitoring the signal, topographic information or geometric information on the specimen 201 is imaged.

A method of forming the probe chip 100 will be explained by reference to FIGS. 3A to 3E.

First, a surface orientation (100) monocrystalline silicon wafer 301 is prepared as a start wafer (FIG. 3A).

Figure 3B:
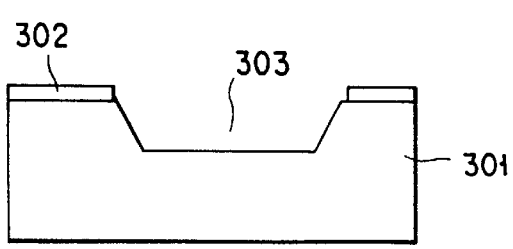

After a silicon oxide film 302 has been formed on the surface of the wafer, the silicon oxide film 302 is partially removed by photolithography to make a square opening so as to expose the surface of the monocrystalline silicon wafer 301. With the silicon oxide film 302 formed on the part except for the square opening as a mask, wet anisotropic etching is performed using aqueous potassium hydroxide to dig the silicon wafer 301 to form a recessed portion 303 (FIG. 3B).

Figure 3C:
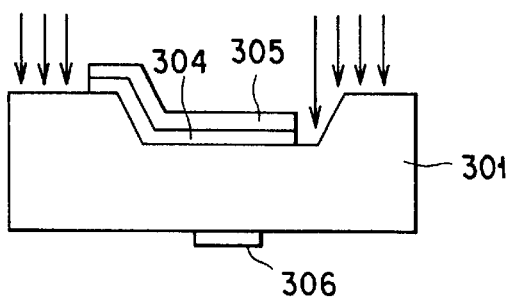

Next, the silicon oxide film 302 is removed using fluoric acid. On the front and back of the wafer 301, silicon nitride films 304 and 306 are formed by low-pressure chemical vapor deposition (LPCVD). Thereafter, photolithography is used to etch the front-side silicon nitride film 304 with a resist film 305 as a mask to pattern the film into a geometry corresponding to the support section 101, elastic member section 102, and probe section 103 (see FIG. 1). Similarly, by photolithography, the back-side silicon nitride film 306 is pattered into a geometry corresponding to the support member 101 (FIG. 3C).

Figure 3D:
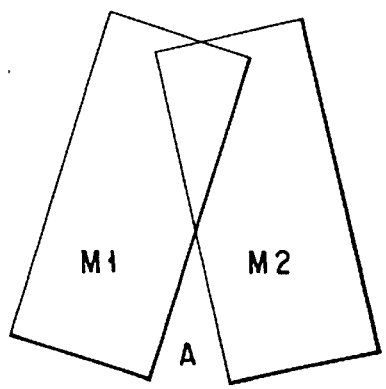

The patterning of the front-side silicon nitride film 304 should be effected twice in order to sharpen the tip of the probe as much as possible. As shown in FIG. 3D, viewed from above, after a resist has been applied to the silicon wafer 301, the resist is exposed with M1 as a mask to make an opening in the resist film. Using the resulting resist film as a mask, dry etching is performed to pattern the silicon nitride film 304. After the resist film has been removed, a resist is applied again. With M2 as a mask, the resist is exposed to make an opening in the resist film. Using the resulting resist film as a mask, another dry etching is performed to pattern the silicon nitride film 304. With this approach, the angle of portion A can be sharpened very much as compared with a single patterning with a triangular mask. For exposure of the resist, a projection aligner was used.

Figure 3E:
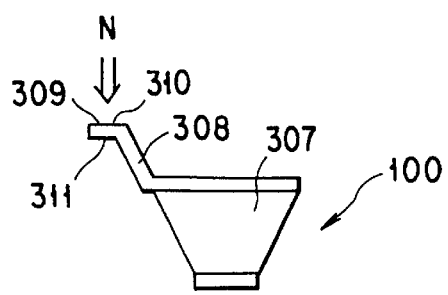

The probe chip 100 is formed by performing wet anisotropic etching on the wafer 301 from the reverse side using aqueous potassium hydroxide (FIG. 3E). As in an ordinary AFM probe chip, metal may be deposited on the cantilever section 308 from the front to form a light reflection coating. At that time, it is desirable that the evaporation material should not adhere to the probe section 309. The reason for this is as follows.

Because the two terminal points 104 and 105 at the probe section 103 shown in FIG. 1C basically function as a probe, the adhesion of the evaporation material to the probe degrades the sharpness of the probe, having an adverse effect on the measurement accuracy. The geometry of a narrow trench or the sidewall of a hole is measured, provided that the probe section 103 can be inserted into the trench or hole. Therefore, the probe section 103 must be thin.

Consequently, as described above, it is desirable that no evaporation material should adhere to the probe section 309 of FIG. 3E.

In the manufacturing method, since the probe section 309 is formed by film deposition, the deposition surfaces 310 and 311 of the probe section 309 are almost parallel to each other, which produces a probe chip having a high aspect ratio with a probe vertical angle of 0°. Making the recessed section slightly wider than the thickness of the probe section produces a probe chip capable of measuring the sidewalls whose slope angle is up to about 90°.

Because the probe section 309 is formed by film deposition, variations in the film thickness fall in the range of 10% or less. This makes it possible to form probes of the same shape much easier than a conventional method of forming a cylindrical probe by digging the silicon film by dry etching. This helps reduce the inspection cost and improve the yield, making it possible to provide a low-cost probe chip.

Furthermore, because the probe section 309 is made of a silicon nitride film, it wears less during measurement, making the reproducibility of measurement data higher.

When the face of the tip of the probe disclosed in Yves Martin, et. al., Apply. Phys. Lett. Vol. 64, No. 19, pp. 2498–255, 1994 is compared with the circular probe chip, the vertical angle of the probe viewed from the direction parallel to the line connecting the two terminal points 104 and 105 at the probe section (the direction of arrow N in FIG. 3E) is as large as about 20°. When a portion to be measured is limited to the area where electrode patterns of, for example, a semiconductor IC, are parallel to each other, and the directions of the probe and the specimen are preferably selected, there is no portion with which the probe section comes into contact in the direction in which the groove is made between the electrode patterns. As a result, the probe section other than the terminal points 104 and 105 of FIG. 1C will not touch the patterns, which will make it possible to measure the roughness or tilt angle of the sidewalls of steps.

Now, another probe chip 400 suitable for observing the sidewalls of steps in a specimen or measuring the tilt angle of the sidewalls will be explained.

Figure 4:
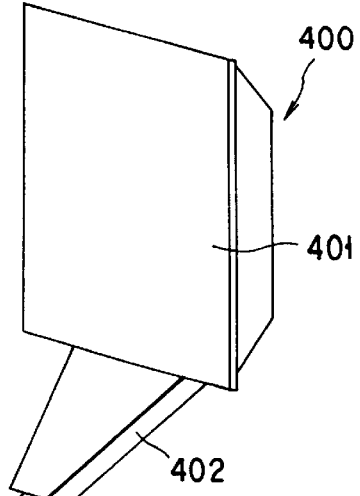
FIG. 4 is a perspective view of a probe chip for a scanning probe microscope according to another embodiment of the present invention.

As shown in FIG. 4, in the probe chip 400, a probe section 403 is in the form of a triangular flat plate, which is the same as in the probe chip 100 of the first embodiment. The thickness of the probe section 403 and that of an elastic member 402 differ from those in the probe chip 100 to optimize such mechanical characteristics as the spring constant of the elastic section 402 and the resonance frequency.

In the probe chip 400, the probe section 403 has a thickness of 0.6 $\mu$m as in the probe chip 100 so that the probe section 403 may be inserted into a narrow spacing in the specimen. The elastic member section 402, however, has a thickness of 2 $\mu$m to raise the resonance frequency of the elastic member section 402.

A method of forming the probe chip 400 will be explained by reference to FIGS. 5A to 5E.

Figure 5A:
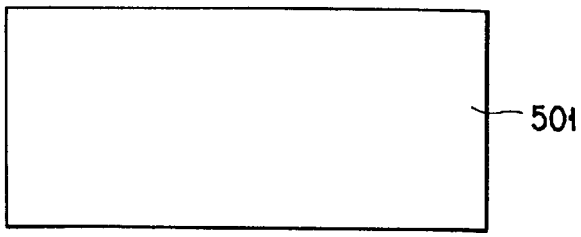
FIGS. 5A to 5E show a series of processes for producing a probe chip shown in FIG. 4.
Figure 5B:
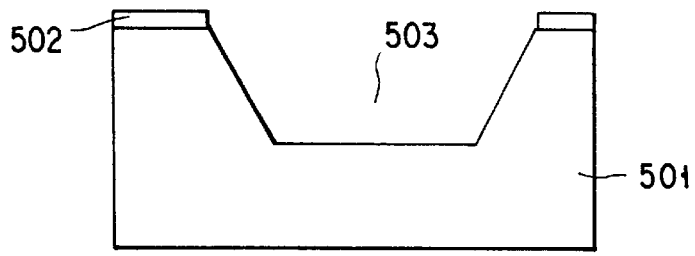

First, a surface orientation (100) monocrystalline silicon wafer 501 is prepared as a start wafer (FIG. 5A). After a silicon oxide film 502 has been formed on the surface of the wafer, the silicon oxide film 502 is partially removed by photolithography to make a square opening so as to expose the surface of the monocrystalline silicon wafer 501. With the silicon oxide film 502 formed on the part except for the square opening as a mask, wet anisotropic etching is performed using aqueous potassium hydroxide to dig the silicon wafer 501 to form a recessed portion 503 (FIG. 5B). Thus far, the method is the same as the method of forming the probe chip 100 of the first embodiment.

Figure 5C:
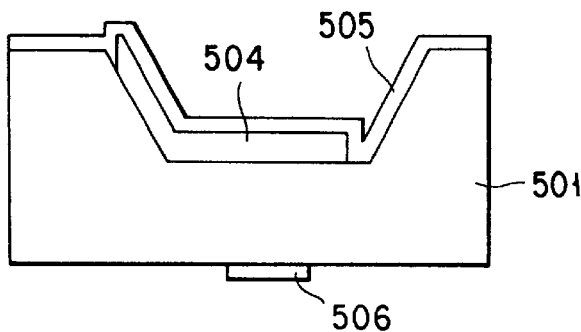

Next, the silicon oxide film 502 is removed using fluoric acid. By low-pressure chemical vapor deposition (LPCVD), a silicon nitride film 504 is deposited to a thickness of 1.4 $\mu$m on the front of the wafer 501. The silicon nitride film 504 is patterned into a geometry corresponding to the elastic member section 402 and support section 401 (see FIG. 4). At the same time, a silicon nitride film 506 is formed on the back of the wafer. The silicon nitride film 506 is patterned into a geometry corresponding to the support section 401. Thereafter, a silicon nitride film 505 is deposited to a thickness of 0.6 µm on the front of the wafer 501 by LPCVD (FIG. 5C).

Figure 5D:
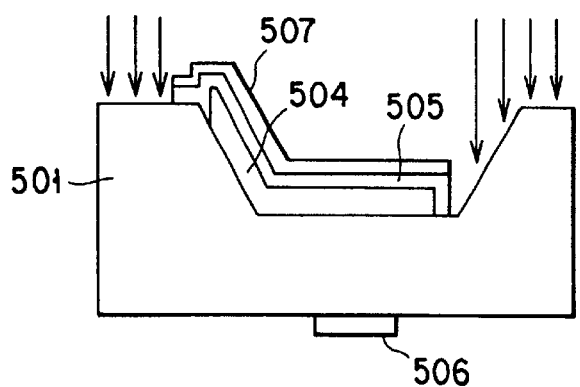

A resist film 507 in the shape corresponding to the support section 401, elastic member section 402, and probe section 403 are provided on the silicon nitride film 505. With the resist film as a mask, patterning is done by dry etching (FIG. 5D). As in the first embodiment, to form the probe section with a sharpened tip, it is desirable that dry etching should be performed twice.

Figure 5E:
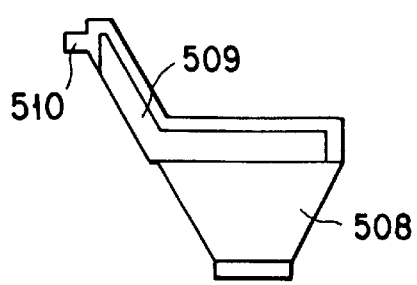

Finally, the probe chip 400 is formed by performing wet anisotropic etching on the wafer 501 from the reverse side using aqueous potassium hydroxide (FIG. 5E). As in an ordinary AFM probe chip, metal may be deposited on the front of the elastic member section 509 to form a light reflection coating. At that time, the evaporation material is prevented from adhering to the probe section 310.

With the present embodiment, easy adjustment of the mechanical characteristics of the elastic member section makes it possible to provide a probe chip with a mechanical characteristic suited for measurement.

While in the embodiment, a silicon nitride film has been used, such a silicon compound as a silicon carbide film or an amorphous carbon film may be used. In this case, too, it is possible to provide a probe chip with a probe superior in wear resistance to a probe made of a monocrystalline silicon.

A probe chip for a scanning probe microscope used for a new scanning probe microscopy, explained later, suitable for observing the sidewalls of steps in a specimen or measuring the tilt angles of the sidewalls will be explained by reference to FIGS. 6A to 6C.

Figures 6A, 6B, 6C:
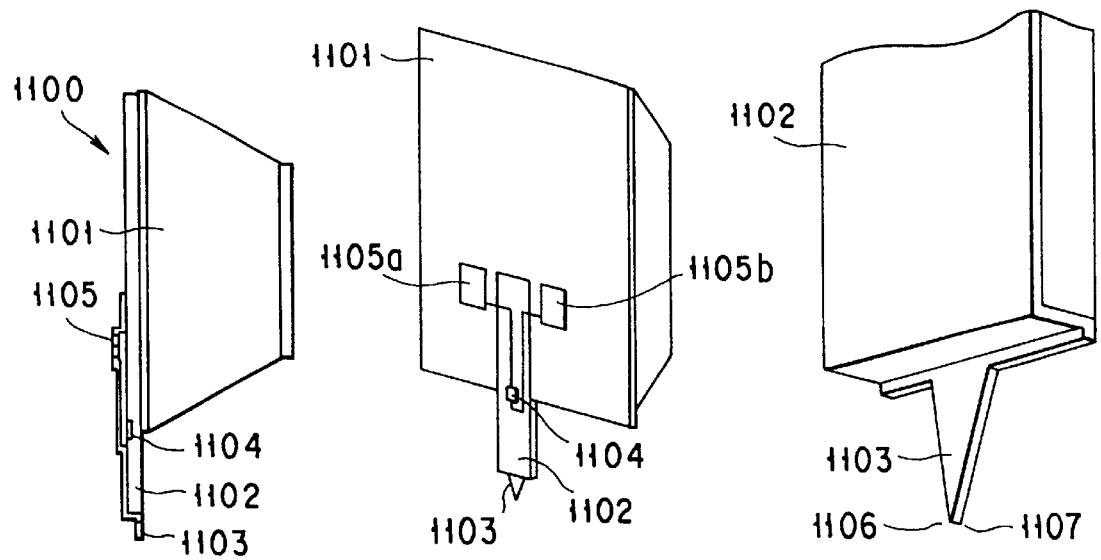
FIG. 6A is a side view of a probe chip for a scanning probe microscope according to still another embodiment of the present invention.
FIG. 6B is a perspective view of the probe chip of FIG. 6A.
FIG. 6C is an enlarged view of the probe section of the probe chip shown in FIG. 6B.

As shown in FIGS. 6A and 6B, a probe chip 1100 has a probe section 1103 formed at the free end of a cantilever or elastic member section 1102 made of an elastic material extending from a support section 1101. As seen from an enlarged view in FIG. 6C, the probe section 1103 is in the form of a triangular flat plate. Three ridges are terminated at two vertexes 1106 and 1107 at the tip of the probe section. The direction normal to the plane of the flat-plate triangular probe section 1103 is almost parallel to the ridge connecting the two terminal points 1106 and 1107 at the tip. The two terminal points 1106 and 1107 or the ridge connecting the two points function as a virtual probe and interact with the surface of the specimen, for example, exert interatomic force or contact force on the specimen. Explanation of the virtual probe will be given later.

The direction normal to the plane of the cantilever-like elastic member section 1102 is parallel to the direction normal to the plane of the flat-plate triangular probe section 1103. The elastic member section 1102 differs from the probe section 1103 in the thickness and geometry. The elastic member section 1102 has a thickness suited for obtaining the desired mechanical vibration characteristics such as the resonance frequency. The probe section 1103 is thin enough to go into the recessed portion of the specimen.

Near the boundary between the elastic member section 1102 and the support section 1101, a sensing mechanism section 1104 for sensing the vibration of the elastic member section 1102 is provided. The signal indicating the vibration of the elastic member section 1102 sensed by the sensing mechanism section 1104 is drawn outside via two electrodes 1105a and 1105b shown in FIG. 6B. In FIG. 6A, the two electrodes 1105a and 1105b are represented by a single reference symbol 1105.

The sensing mechanism section 1104 comprises, for example, a sensor making use of the piezo resistance effect of silicon. The sensing mechanism section 1104 is not restricted to this and may comprise various elements. For instance, instead of the above sensor, a sensor making use of the piezo resistance effect of polysilicon may be used. Moreover, a sensor making use of the piezoelectric effect of zinc oxide or PZT (titanic acid zinc zirconate) may be used. In general, sensors making use of the piezo resistance effect have the advantage that they are easy to manufacture, whereas sensors making use of the piezoelectric effect have the advantage that they have less thermal noise and a high sensitivity and enable a high frequency band.

Typical dimensions of the actually formed probe chip 1100 are as follows: the rectangular cantilever-like elastic member section 1102 has a length of 80 µm, a width of 30 µm, and a thickness of 4.5 µm, and the flat-plate rectangular probe section 1103 has an axial length of 10 µm, a base width of 5 µm, and a thickness of 0.2 µm. Furthermore, the cantilever portion formed by combining the elastic member section 1102 with the probe section 1103 has a mechanical resonance frequency of about 600 kHz. The flat-plate rectangular probe section 1103 has a higher mechanical resonance frequency than that of the cantilever portion.

The elastic member section 1102 is designed optimally according to the frequency band and other factors of the measuring circuit. The elastic member section has a length in the range of 20 to 300 µm, a width in the range of 10 to 80 µm, and a thickness in the range of 1 to 8 µm. The probe section 1103 is designed, taking into account the resonance frequency of the elastic member section 1102 and the geometry of the specimen to be measured. As the dimension of the thickness, a smaller value than the width of the recessed section of the specimen is selected. The probe section 1103 has an axial length in the range of 3 to 20 µm, a base width in the range of 2 to 15 µm, and a thickness in the range of 0.05 to 0.5 µm.

Figures 7A, 7B:
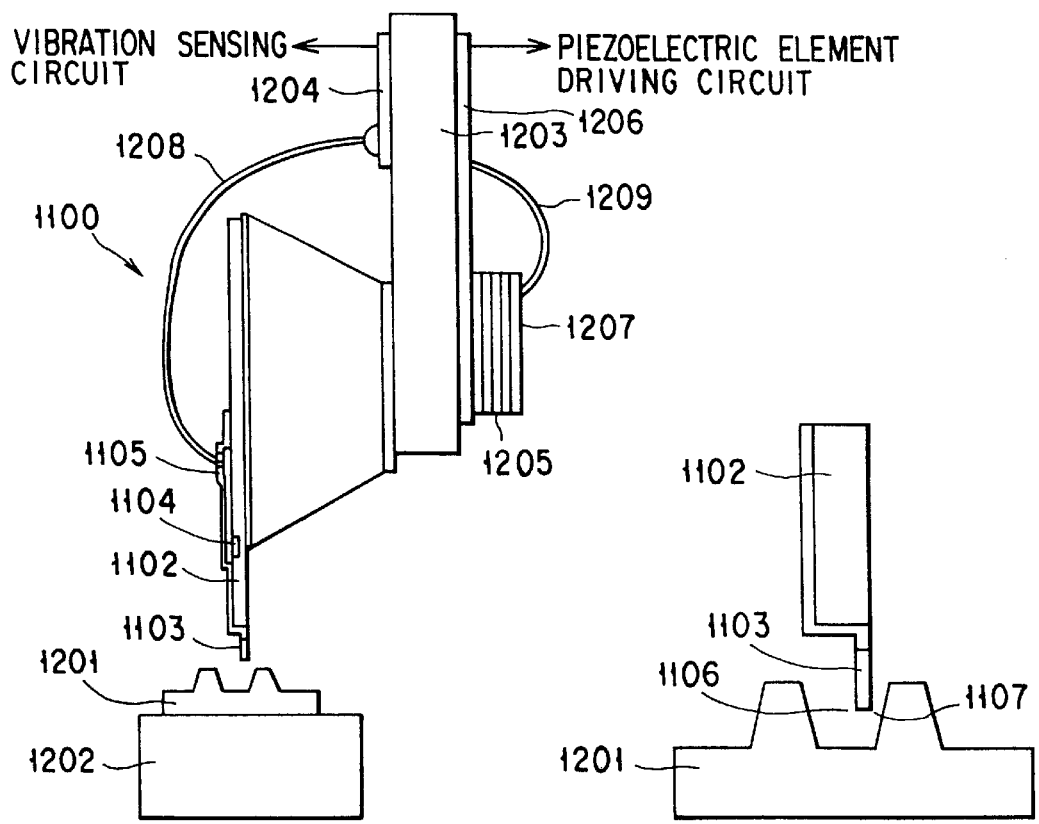
FIG. 7A shows the location of the parts when the probe chip shown in FIGS. 6A to 6C measures the surface of a specimen.
FIG. 7B is an enlarged view of the probe section of the probe chip of FIG. 7A and its vicinities.

As shown in FIG. 7A, the probe chip 1100 is secured to a probe chip holding member 1203 in such a manner that the axial direction of the probe section 1103, i.e., the axial direction of the elastic member section 1102, is parallel to the direction normal to the average plane of the specimen 1201 placed on a specimen carrier 1202. An electrode pattern 1204 is printed on the probe chip holding member 1203. The electrode pattern 1204 is electrically connected to an electrode 1105 on the probe chip 1100 via a wire 1208. This allows the signal from the sensing mechanism section 1104 reflecting the vibration of the elastic member section 1102 to be directed to a vibration sensing circuit (indicated by reference symbol 1432 in FIG. 9B) via the electrode pattern 1204.

Actually, the probe chip 1100 has two electrodes 1105a and 1105b as shown in FIG. 6B. Accordingly, the probe chip holding member 1203 has two electrode patters, which are connected respectively to the electrodes 1105a and 1105b via separate wires. In FIG. 7A, one electrode of the probe chip 1100 is indicated by reference symbol 1105, one wire reference symbol 1208, and one electrode pattern of the probe chip holding member 1203 reference symbol 1204. These represent the other.

An electrode pattern 1206 is printed on the opposite side of the probe chip holding member 1203. A piezoelectric element 1205 is stuck to the electrode pattern. An electrode 1207 on the opposite side of the piezoelectric element 120 is connected to another electrode (not shown) formed on the probe chip holding member 1203 via a wire 1209. The piezoelectric element 1205 is connected to a piezoelectric element driving circuit (indicated by reference symbol 1433 in FIG. 9B). Being powered by an alternating-current voltage generated at the piezoelectric driving circuit, the piezoelectric element 1205 excites the elastic member section 1102 and probe section 1103 of the probe chip 1100 at a frequency near the resonance frequency.

As shown in FIG. 7B, because the thickness of the elastic member section 1102 is almost equal to the width of the spacing between two projections of a specimen 1201, the elastic member section 1102 cannot go into the recessed portion of the specimen 1201. The probe section 1103 is thinner than the elastic member section 1102, so that the probe section 1103 can go into the spacing between the two projections of the specimen 1201. Because the probe section 1103 is in the form of a flat plate and has a more acute angle than the tilt angle of the two projections of the specimen 1201 when viewed from above, the probe section 1103 can be inserted as far as the root of the two projections of the specimen 1201.

One of the two terminal points 1106 and 1107 at the tip of the probe section 1103 or the ridge connecting these points approaches the specimen 1201 the most. The portion closest to the specimen 1201 acts as a site that induces interaction. In FIG. 7B, the terminal point 1107 is closest to the sidewall of the left-side projection of the specimen 1201 and therefore acts as a site that induces interaction, whereas the terminal point 1106 is closest to the sidewall of the left-side projection of the specimen 1201 and therefore acts as a site that induces interaction. Furthermore, the ridge connecting the two terminal points 1106 and 1107 is closest to the bottom surface between the two projections of the specimen 1201 and therefore acts as a site that induces interaction.

A scanning probe microscopy using the probe chips shown in FIGS. 6A to 6C will be described by reference to FIGS. 8A to 8D. In these figures, to make it easier to understand the state of vibration, the elastic member section and probe section are shown as a single cantilever.

In FIG. 8A, when the piezoelectric element 1303 is excited, the vibration energy is transmitted to the cantilever 1302 via the support section 1301. If the energy coincides with the resonance mode of the cantilever 1302, the cantilever 1302 will vibrate in the basic mode as shown in FIG. 8A or in a higher degree mode as shown in FIG. 8B. In the cantilever 1302, the free end presents the maximum amplitude. Actually, the amplitude is set in the range of about 0.005 to 0.3 $\mu$m.

As shown in FIG. 8C, although the shape of the vibrating cantilever 1302 takes the form of a very thin triangular plate at each instant, the locus of the cantilever 1302 during one period of the vibration or more takes the form of a thicker free end.

In the scanning probe microscopy of the present embodiment, the locus of the vibrating cantilever 1302 is considered as a virtual probe. On the basis of the interaction between the virtual probe and the surface of the specimen, the surface of the specimen is observed.

As shown in FIG. 8D, the virtual probe has two vertexes 1303 and 1304 and an arc-shaped ridge connecting these two vertexes. Such a shape is obtained only when the cantilever 1302 is vibrated. Therefore it is very difficult to form the shape as a single solid using semiconductor processes.

A scanning probe microscope to which the scanning probe microscopy has been applied will be explained by reference to FIG. 9.

Figure 9A:
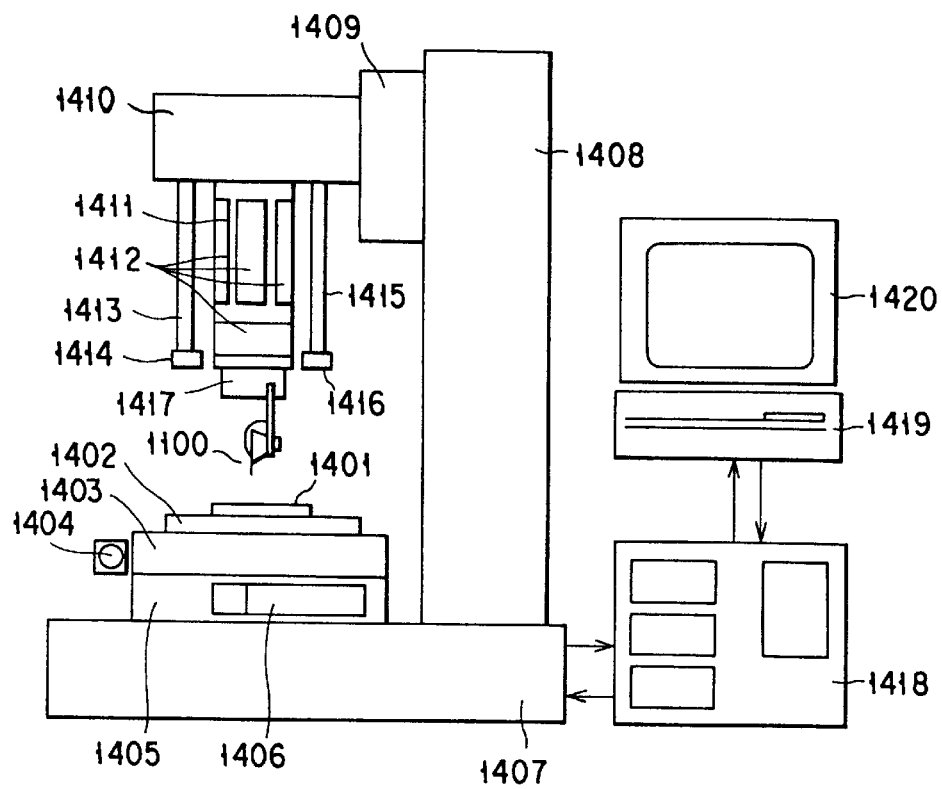
FIG. 9A shows a schematic configuration of a scanning probe microscope using the probe chip shown in FIGS. 6A to 6C.

As shown in FIG. 9A, the probe chip 1100 is arranged so as to face the specimen 1401. On an instrument base 1407, there is provided a coarse adjustment stage composed of a rotating stage 1402, an X coarse adjustment stage 1403, and a Y coarse adjustment stage 1405. On the coarse adjustment stage, the specimen 1401 is held in place. The X coarse adjustment stage 1403 and Y coarse adjustment stage 1405 are driven by an X coarse adjustment stage driving mechanism 1404 and a Y coarse adjustment stage driving mechanism 1406 on the basis of the control signal from a computer 1419, whereby the relative position between the probe chip 1100 and the specimen 1401 in the horizontal direction can be adjusted. The rotating stage 1402 is driven by a driving mechanism (not shown) on the basis of the control signal from the computer 1419, whereby the relationship between the direction normal to the plane of the probe section 1103 of the probe chip 1100 and the direction in which the pattern on the specimen 1401 to be measured extends can be adjusted.

The probe chip 1100 is attached to a scanner 1411 via a holding member 1417. The scanner 1411 is stuck to a scanner holding member 1410, which holds the scanner. The scanner holding member 1410 is provided on a prop 1408 raised on the instrument base 1407 via the Z coarse adjustment stage 1409. Moving the Z coarse adjustment stage 1409 up and down causes the scanner holding member 1410, scanner 1411, and probe chip 1100 to move up and down simultaneously, thereby adjusting the spacing between the probe chip 1100 and the specimen 1401.

The scanner 1411 is a tube scanner made up of a piezoelectric element. When the control driving signals from a controller 1418 and the computer 1419 are applied to a scanner electrode 1412, this causes the scanner 1411 to move slightly in the directions of X, Y, and Z. This enables the probe chip 1100 supported by the scanner 1411 to scan the specimen 1401.

An X displacement sensor 1414 and a Y displacement sensor 1416 are supported respectively by an X displacement sensor holding section 1413 and a Y displacement sensor holding section 1415 fixed to the scanner holding member 1410. For this reason, when the Z coarse adjustment stage 1409 moves up and down, the X displacement sensor 1414 and Y displacement sensor 1416 move up and down together with the scanner 1411, which prevents the relative position between them from changing and keeps the relative position constant. The movement of the scanner 1411 is monitored by the X displacement sensor 1414 and Y displacement sensor 1416. The outputs from the X displacement sensor 1414 and Y displacement sensor 1416 are supplied to the controller 1418 or computer 1419.

Figure 9B:
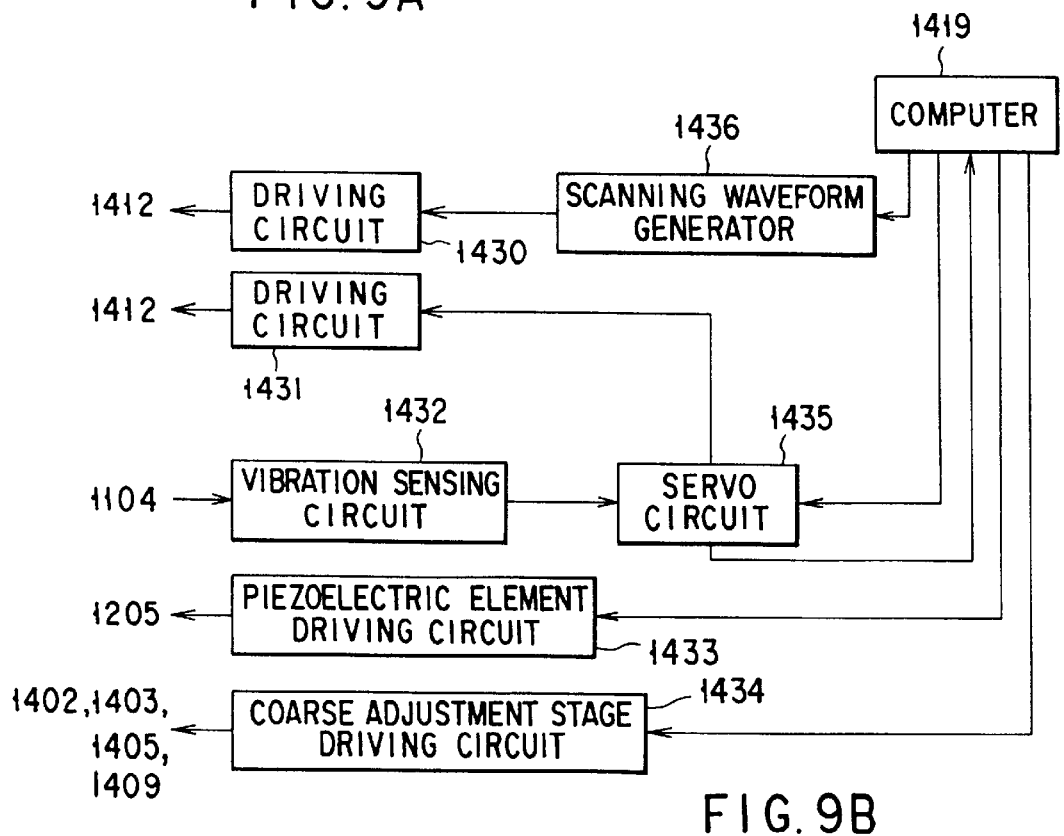
FIG. 9B shows the structure of the controller of FIG. 9A.

As shown in FIG. 9B, the controller 1418 includes various function units. Specifically, the controller 1418 includes a piezoelectric driving circuit 1433 for exiting the probe chip 1100 at a specific frequency on the basis of the control signal from the computer 1419, a vibration sensing circuit 1432 for amplifying the signal from the sensing mechanism section 1104 of the probe chip 1100 and sensing a change in the state of vibration of the elastic member section 1102, a servo circuit 1435 for driving the scanner 1411 in the direction of Z so as to maintain the signal from the vibration sensing circuit 1432 at a constant setting value supplied from the computer 1419, a Z driving circuit 1431 for driving the scanner 1411 in the direction of Z, an XY driving circuit 1430 for driving the scanner 1411 in the directions of X and Y on the basis of the signal from an XY scanning waveform generator circuit 1436, and a coarse adjustment stage driving circuit 1434 for driving the Z coarse adjustment stage 1409 and the coarse adjustment stages 1403 and 1405. In terms of the configuration of the coarse adjustment stage, the coarse adjustment stage driving circuit 1434 may be provided with the function of driving the rotating stage 1402 (see FIG. 9B). On the basis of the control signal from the servo circuit 1435 of the controller 1418, the computer 1419 calculates the unevenness in the surface of the specimen, displays the results on a monitor 1420 serving as display means, and functions as an instruction input device, such as a keyboard.

As shown in FIG. 7A and FIG. 9A, the probe chip 1100 is arranged so that the axial direction of the probe section 1103 may be almost parallel to the direction normal to the average plane of the specimen 1401. An alternating-current voltage at a frequency near the resonance frequency of the elastic member section 1102 and probe section 1103 of the probe chip 1100 is applied to the piezoelectric element 1205 for exciting the probe chip 1100. As a result, the elastic member section 1102 and probe section 1103 of the probe chip 1100 vibrate in the direction parallel to the. average plane of the specimen 1401.

When the probe chip 1100 is brought closer to the specimen 1401 while being excited and the tip of the probe section 1103 (more precisely, the vertexes indicated by numerals 1303 and 1304 of the virtual probe or the ridge connecting the vertexes shown in FIG. 8D) interacts with the surface of the specimen 1401, the sidewalls of the projections in the specimen 1401 exert force in the direction normal to the plane of the probe section 1103 (in the direction parallel to the average plane of the specimen) and the bottom surface between the projections in the specimen 1401 exerts force in the axial direction of the probe section 1103 (in the direction normal to the average plane of the specimen). As a result, the state of vibration of the elastic member section 1102 changes.

Changes in the state of vibration are sensed by the sensing mechanism section 1104 of the probe chip 1100 and the vibration sensing circuit 1432. The servo circuit 1435 causes the driving circuit 1431 to drive the scanner 1411 so as to maintain the sense signal at a constant setting value from the computer 1419. The computer 1419 takes in the control signal at that time as positional information in the direction of Z on the specimen 1401 in the directions of X and Y of the probe section 1103 at that time. Making calculations by correlating the XY-direction positions with the Z-direction positional information, the computer 1419 determines the surface geometry of the specimen 1401. The determined surface geometry is displayed on the monitor 1420, for example, in the form of a three-dimensional image.

In a conventional scanning probe microscope using a probe chip provided with a probe projecting almost vertically from the free end of the cantilever, to prevent the support section for the probe chip from colliding with the specimen, the probe chip is provided on the instrument so that the cantilever may extend diagonally downward. As a result, the probe chip is supported in such a manner that the axis of the probe is inclined to the direction normal to the average plane of the specimen. Therefore, the obtained information depends on the direction of inclination of the probe. For example, in the case of images obtained when a specimen symmetrical with the direction of inclination of the probe (the direction parallel to the plane including the direction of the average normal line to the specimen and the axis of the probe), the symmetry of the images in that direction is not be maintained and they are distorted, losing their symmetry.

With the scanning probe microscope of the present embodiment, because the probe chip 1100 is arranged so that the axis of the probe section 1103 may be parallel to the direction normal to the average plane of the specimen 1401 as described above, the obtained information does not depend on the direction of inclination of the specimen's surface. Accordingly, the measurement result of the specimen symmetrical in the direction of the main scanning of the probe section 1103 (the direction parallel to the plane in FIG. 7B) keeps the symmetry and is accurate.

Here, the difference between the scanning probe microscope of the embodiment and a conventional shearing force mode AFM will be described. The shearing force mode AFM, which has been disclosed in, for example, U.S. Pat. No. 5,254,854, is similar to the scanning probe microscope of the present invention only in that the probe chip is vibrated.

The conventional shearing force mode AFM, however, uses a probe whose tip is terminated at one point. The radius of curvature of the tip is about 10 nm. Since the locus the tip of the vibrating probe draws is a factor that decreases the lateral resolution, it is desirable that the width of the locus of the vibration of the probe's tip should be as small as possible on condition that the state of vibration of the probe can be sensed.

As described above, the shearing force mode AFM uses the locus of the vibration of the probe section on the vibrating probe chip as a virtual probe and differs greatly from the scanning probe microscope of the present invention positively making use of the feature of the shape.

As seen from the above explanation, with the scanning probe microscope of the embodiment, feedback control only in the direction of Z of the probe position makes it possible to measure a vertical portion or a portion with an almost vertical slope in the specimen, which enables measurement in a short time.

While in the embodiment, feedback control of the probe position is performed only in the direction of Z, a lock-in amplifier may be used to sense the state of vibration of the probe more precisely in terms of phase as well as amplitude and the position of the probe may be moved in a direction inclined from the direction of Z on the basis of the sense result. This makes it possible to measure the sidewall of a specimen having not only vertical walls but also a slightly overhanging portion.

While feedback control in the embodiment is carried out during the measurement (scanning) of the specimen in such a manner that interaction between the specimen and the probe is always kept constant, the probe may be brought closer to the specimen or separated from the specimen each time measurement is made.

Specifically, measurement points are usually set (for example, 256 points or 512 points are sets at regular intervals) on one scanning line in measuring a specimen. In measurement, the probe is stopped at each measurement point and the probe is brought closer to the specimen. After the desired information on the specimen has been acquired, the probe is separated from the specimen and then brought closer to the next measurement point. The up-and-down movement of the probe is effectively made with the help of the scanner 1411 explained in the embodiment.

Such control is repeated in the measurement (scanning) area of the specimen, which provides information on the surface of the specimen.

In the measurement, when the probe is moved from one measurement point to another, it is separated from the specimen. This alleviates the disadvantage that the probe comes into contact with the specimen more than necessary and would cause damage to the specimen.

Furthermore, when the recessed portion in the specimen 1201 shown in FIG. 7B is measured, the thickness component of the probe section 1103 is added to the measurement results of both the sidewalls. That is, the width of the recessed portion obtained from measurement is smaller than the actual width. To overcome this problem, it is effective for the controller 1418 to correct the measured geometry of the recessed portion, taking into account the thickness component of the probe section 1103. Such a calculation process will provide more accurate measurement results.

The same is true for the measurement results obtained by using the goose chips shown in FIGS. 1 and 4. Calculations taking into account the thickness component of the probe section 103 will provide more accurate measurement results.

Hereinafter, a method of forming the probe chip 1100 will be explained by reference to FIGS. 10A to 10J.

Figure 10A:
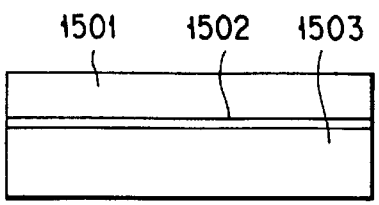
FIGS. 10A to 10J show a series of processes for producing a probe chip shown in FIGS. 6A to 6C.

First, a surface orientation (100) monocrystalline silicon laminated wafer is prepared as a start wafer (FIG. 10A). Two pieces of monocrystalline silicon 1501 and 1503 are laminated together with a silicon oxide film 1502 between them. A 10-μm-thick active layer 1501 is used. Before the next process starts, the active layer 1501 is etched to a thickness of 5.5 μm.

Figure 10B:
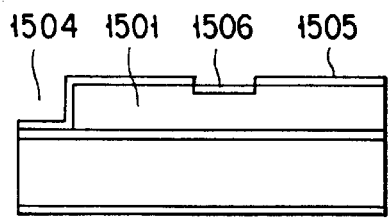

After a part of the active layer 1501 at the surface is dry-etched by photolithography, a silicon oxide film 1505 is formed and then a square opening is made by photolithography. Then, boron is diffused into the active layer 1501 from the opening in a diffusion furnace. Thereafter, annealing is effected to form a piezoelectric resistance layer 1506 (FIG. 10B).

Figure 10C:
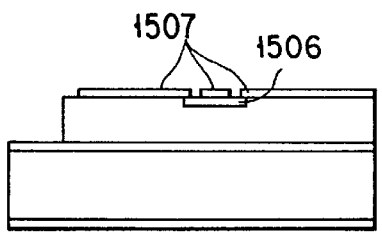

Next, the silicon oxide layer 1505 on the surface is removed. After a silicon oxide layer 1507 has been deposited again, patterning is achieved by photolithography to make two openings in the piezo resistance layer 1506, which provides places in which electrodes are drawn from the piezo resistance layer 1506 (FIG. 10C).

Figure 10D:
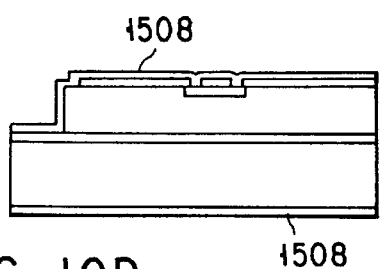
Figure 10E:
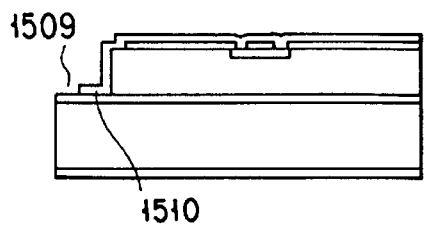
Figure 10F:
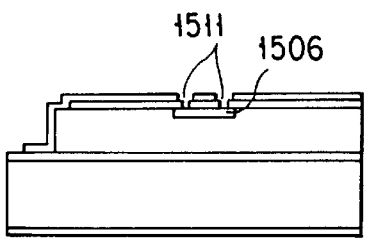

Then, as shown in FIG. 10D, a silicon nitride layer 1508 is deposited to a thickness of 0.2 μm on the surface by low-pressure chemical vapor deposition (LPCVD). A part 1509 of the silicon nitride film is subjected to patterning and removed. This roughly forms the shape 1510 of the probe section of the probe chip. As shown in FIG. 10F, the silicon nitride film on the electrode draw-out portion of the piezo resistance layer 1506 is removed to form an opening 1511, thereby exposing part of the piezo resistance layer 1506.

Figure 10G:
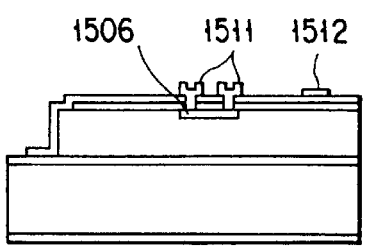

As shown in FIG. 10G, after the electrodes have been formed, two openings on the piezo resistance layer 1506, an electrode pattern 1512, and a wiring pattern that connects them are patterned by vacuum disposition of chromium and gold using lift-off processes.

Figure 10H:
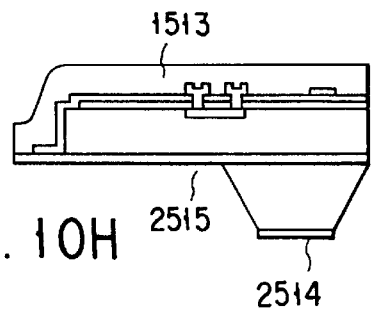
Figure 10I:
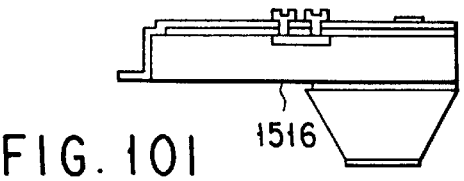

Next, as shown in FIG. 10H, the surface is coated with a polyimide film to form a protective layer 1513 against a wet etching solution. Thereafter, with the silicon nitride layer 1514 on the back of the wafer as a mask, wet anisotropic etching is performed using aqueous potassium hydroxide to dissolve a part 1515 of the back of the silicon wafer. Next, the exposed silicon oxide layer 1516 is removed using fluoric acid (FIG. 10I), which produces a probe chip.

Figure 10J:
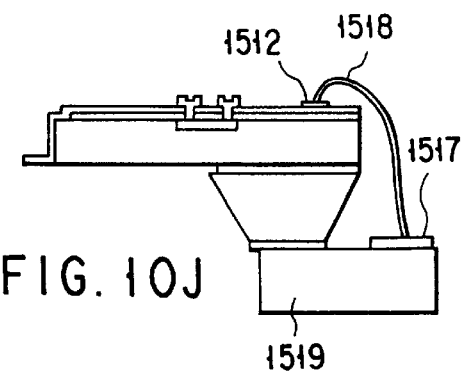

As shown in FIG. 10J, the probe chip is stuck to a probe chip holding member 1519 and the electrode pattern 1512 of the probe chip is connected to the electrode 1517 of the probe chip holding member 1519 with a wire 1518. The probe chip holding member 1519 is, for example, a ceramic plate. The electrode 1517 is formed by printing a gold paste and achieving patterning. Although not shown, the wire 1518 is preferably sealed with protective resin.

As having thus far described, because the probe section of the probe chip is made up of a deposited film, variations in the film thickness fall in the range of 10% or less, which makes it easy to manufacture probe sections of the same shape. This reduces the inspection cost and improves the yield and further provides relatively low-cost probe chips.

Because the probe section is made up of a deposited film, a thin probe chip with a high aspect ratio is formed stably. As a result, a wider recessed section than the thickness of the probe section makes it possible to measure the sidewalls whose slope angle is up to about 90°.

Furthermore, because a silicon nitride film is used as a material for the probe section, this provides a probe chip with the probe section hard to wear, which increases the reproducibility of measurement data.

Moreover, because the probe section and the elastic member section are parallel with each other and constitute an integral cantilever, the number of problems arising during manufacturing is small even when the thickness or shape is changed for the optimum geometry for each specific purpose. This makes it possible to manufacture probe chips stably.

Additionally, because the mechanism for sensing the state of vibration of the elastic member is integrated, a separate sensor need not be externally provided, which makes it possible to design a simple, compact scanning probe microscope. As a result, this provides a rigid, stable instrument immune to external vibration.

When the probe chip is viewed in the direction parallel to the line connecting the two terminal points 1106 and 1107 of the probe section, the probe section is in the shape of a triangle. Although the vertical angle is as large as 5° to 30°, this will cause no problem, provided that the measurement area is restricted to an area where the electrode patterns of a semiconductor IC are parallel to each other. Consequently, it is possible to measure the roughness of the sidewalls (vertical walls) of steps or the tilt angle of the sidewalls.

Use of the locus of the probe's tip of the vibrating probe chip as a virtual probe makes it possible to use a probe whose shape is stable in terms of manufacturing processes to measure a vertical portion or a portion with an almost vertical slope in the specimen.

Furthermore, the probe chip is arranged so that the axis of the probe section may be parallel to the direction normal to the average plane of the specimen. Use of the locus of the probe's tip of the vibrating chip as a virtual probe makes it possible to measure a symmetrical, vertical portion in the specimen or a portion with an almost vertical slope in the specimen.

Moreover, just controlling the probe position in the direction of Z by the same control method as in the conventional shearing force mode makes it possible to measure a vertical portion or a portion with an almost vertical slope in the specimen in a short time.

Still furthermore, controlling the probe position in a direction inclined from the direction of Z makes it possible to measure a portion with a further inclined wall.

A holding mechanism suitable for holding the probe chip 100 shown in FIGS. 1A and 1B or the probe chip 400 shown in FIG. 4 will be explained.

The probe chip 100 resembles the probe chip 400 in the entire shape. When viewed from the side, the entire shape looks like a bird floating on the water, they are generally called goose chips. They are represented by reference symbol 2590.

Specifically, a goose chip has a flat-plate probe section at the tip of a cantilever extending from a support section. The goose chip is characterized in that the normal line to the plane of the probe section is almost parallel to the normal line to the plane of the support section and the normal line to the plane of the cantilever is nonparallel to the normal line to the plane of the support section.

In contrast, a conventional probe chip has a conical probe section at the tip of a cantilever extending from a support section. It is characterized in that the axis of the probe section, the normal line to the plane of the cantilever, and the normal line to the plane of the support section are almost parallel to each other.

Hereinafter, such a probe chip is called a usual probe chip in contrast to a goose chip. The usual probe chip is indicated by reference symbol 2580.

Figure 11A:
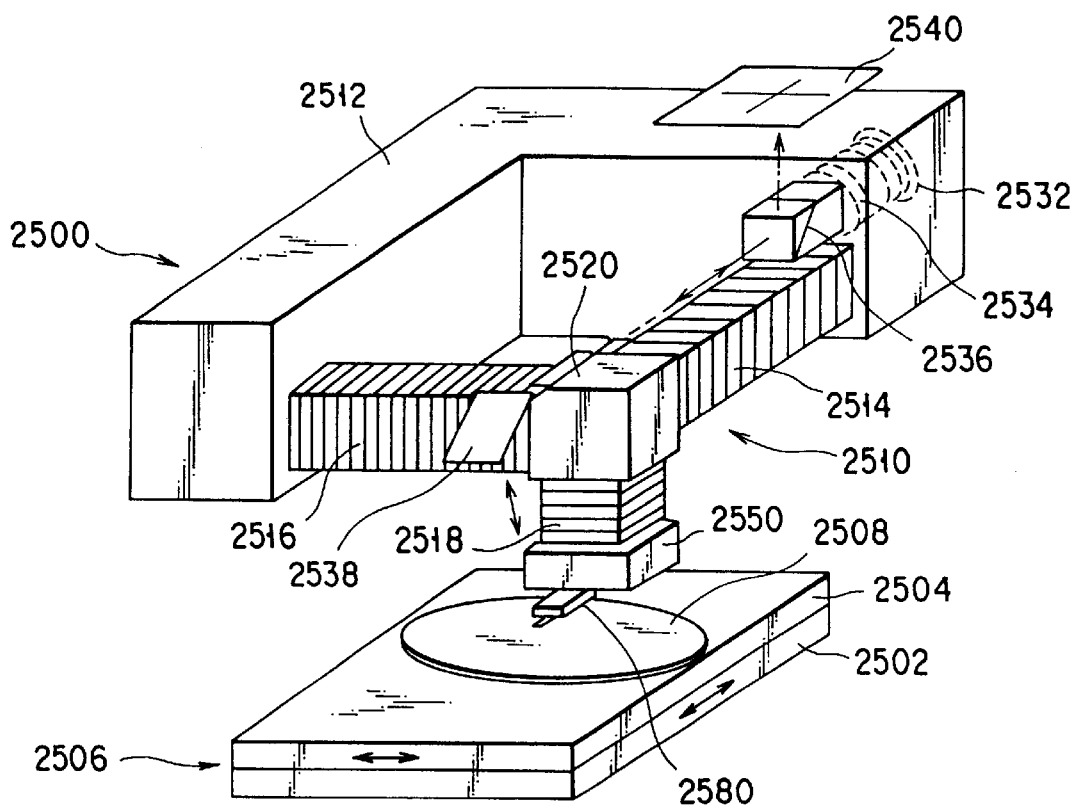
FIG. 11A is a schematic perspective view of an SPM head provided with a probe chip holding mechanism that holds the probe chip of FIGS. 1A and 1B or the probe chip of FIG. 4 suitably.
Figure 12A:
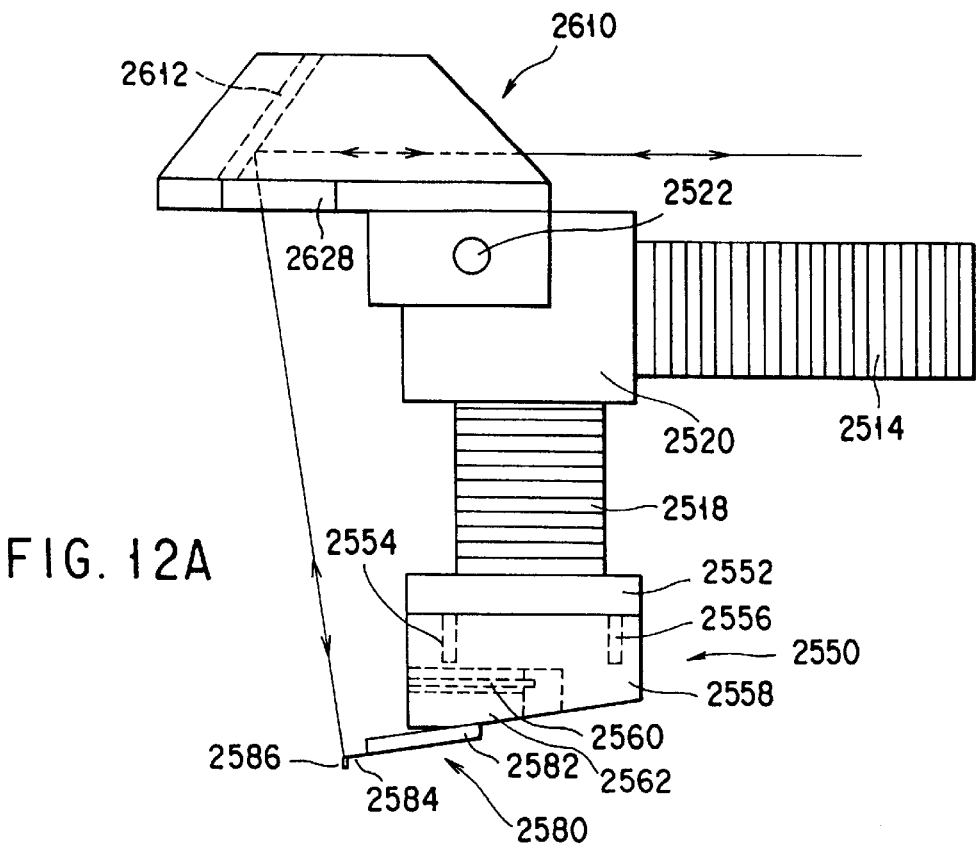
FIG. 12A is a side view of the SPM head of FIG. 11A provided with a mirror holding mechanism for usual probe chips to install a usual probe chip.
Figure 12B:
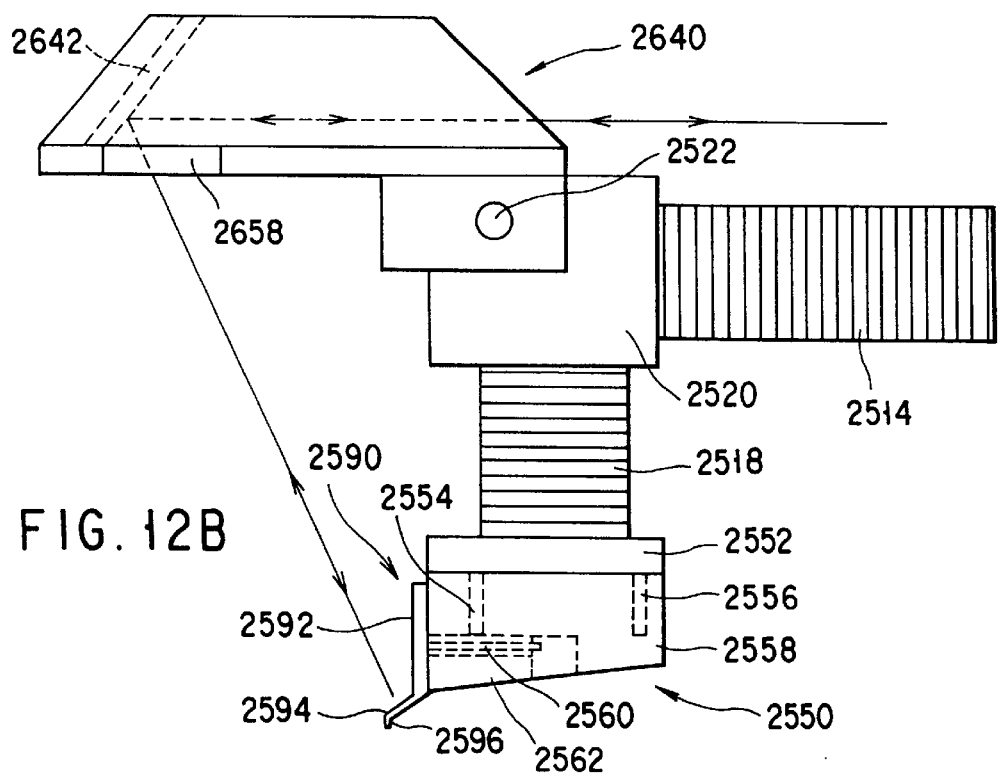
FIG. 12B is a side view of the SPM head of FIG. 11A provided with a mirror holding mechanism for goose chips to install a goose chip.

FIG. 11A shows a schematic configuration of an SPM head provided with a holding mechanism suitable for goose chips. The SPM head enables not only a usual probe chip 2580 to be installed on it as shown in FIG. 12A but also a goose chip 2590 to be installed on it as shown in FIG. 12B. FIG. 11A shows the usual probe chip 2580 as the representative.

As shown in FIG. 11A, a specimen 2508 to be measured is placed on an XY stage 2506 provided with an X stage 2502 and a Y stage 2504 both capable of coarse adjustment in the directions of X and Y crossing at right angles with each other. Above the specimen 2508, an SPM head 2500 is positioned. The SPM head 2500 is provided on a Z stage (not shown) capable of coarse adjustment in the direction of Z. The coarse adjustment XY stage 2506 and Z stage are secured to a housing or a base member (not shown) at their mounting sites. The SPM instrument is usually placed on a vibration damper to make it difficult for external vibration to reach the measurement site (near the specimen).

The SPM head 2500 basically includes a tripod piezoelectric actuator 2510 for fine adjustment and scanning in the directions of X, Y, and Z, a probe chip holding mechanism 2550 for holding a probe chip, and a lever displacement sensing mechanism for sensing the displacement of the cantilever of the probe chip 2580. If necessary, the SPM head 2500 further includes a monitor mechanism for monitoring the movement (displacement) of the fine adjustment stage mechanism.

The lever displacement sensing mechanism is an optical displacement sensor of the optical lever type. The optical displacement sensor comprises a laser 2532 for emitting measurement light, a lens 2534 for collimating the measurement light from the laser 2532, a reflecting mirror 2538 for deflecting the measurement light toward the cantilever of the probe chip, a half mirror 2536 for separating the return light from the cantilever of the probe chip, and a photodetector 2540 for outputting a signal proportional to the displacement of the cantilever of the probe chip on the basis of the received light.

Furthermore, a ¼ wavelength plate may be inserted between the half mirror 2536 and the cantilever 2584 of the probe chip 2580 and a deflection beam splitter be used in place of the half mirror 2536. This configuration would direct light to the photodetector 2540 at high efficiency.

The position and direction of the reflecting mirror 2538 are adjusted according to the type of the probe chip provided on the probe chip holding mechanism 2550, that is, depending on whether the probe chip is a usual probe chip or a goose chip. In the present embodiment, as described later, a separate reflecting mirror is prepared for each type of probe chip. The reflecting mirror corresponding to the installed probe chip is positioned.

The tripod piezoelectric actuator 2510 includes an X-direction fine adjustment stage mechanism 2514 secured almost vertically to one inner side face of an L-shaped fixed frame 2512, a Y-direction fine adjustment stage 2516 secured almost vertically to another inner side face of the L-shaped fixed frame 2512, a cubic terminal member 2520 to which the X-direction fine adjustment stage mechanism 2514 and Y-direction fine adjustment stage 2516 are secured, and a Z-direction fine adjustment stage mechanism 2518 secured to the bottom surface of the terminal. member 2520. The probe chip holding mechanism 2550 is fixed to the lower end of the Z-direction fine adjustment stage mechanism 2518.

For example, the X-direction fine adjustment stage 2514, Y-direction fine adjustment stage 2516, and Z-direction fine adjustment stage 2518 are composed of stacked piezoelectric elements.

As shown in FIGS. 12A and 12B, the probe chip holding mechanism 2550 has a probe chip holding section pad 2552 fixed to the Z-direction fine adjustment stage 2518. A probe chip holding section 2558 is attached to the probe chip holding section pad 2552 with a fixing pin 2554. The probe chip holding section 2558 has a probe chip rest 2562.

The support section 2582 for the usual probe chip 2580 is mounted on the bottom of the probe chip rest 2562 as shown in FIG. 12A. The support section 2592 for the goose chip 2590 is mounted on the side face of the probe chip rest 2562 as shown in FIG. 12B. The probe chip 2580 and goose chip 2590 are stuck to the probe chip rest 2562 easily with an adhesive.

Furthermore, the probe chip rest 2562 has a corresponding mounting or adhesion surface for holding each of the usual probe chip 2580 and goose chip 2590 in place.

Inside the probe chip holding section 2558, a piezoelectric element 2560 for exciting the goose chip mounted on the holding section is provided.

Figure 11B:
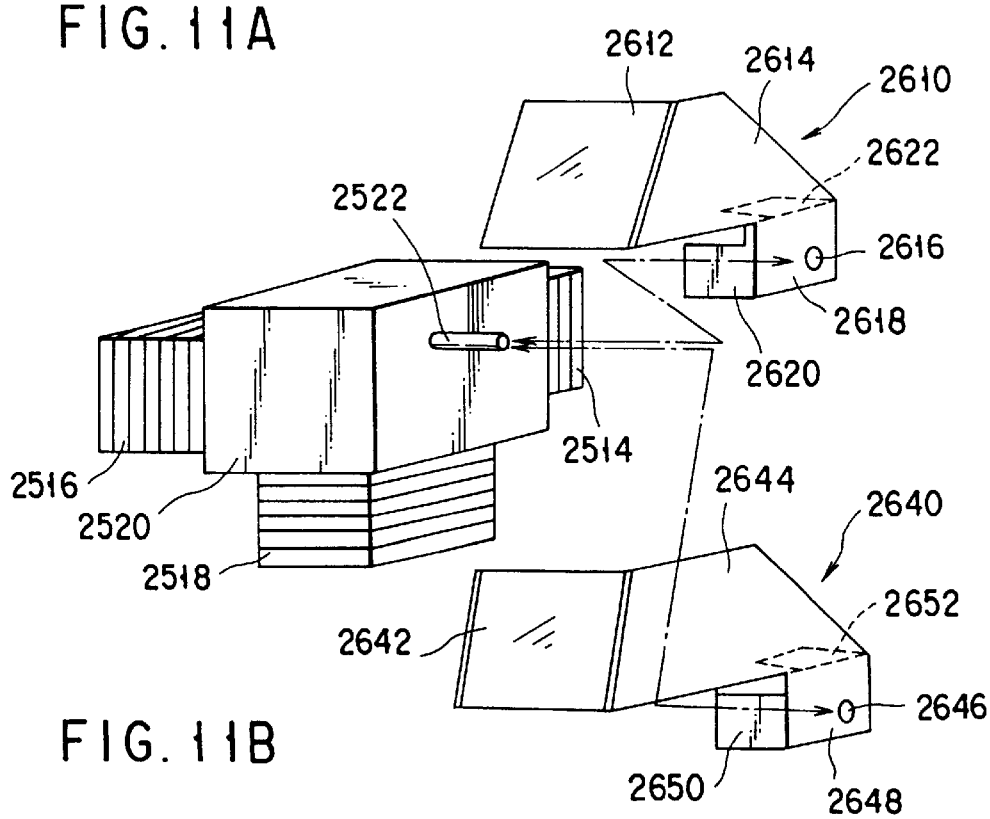
FIG. 11B is a perspective view of two types of mirror holding mechanism provided on the terminal member of a piezoelectric actuator according to the type of probe chip.

As described above, the position and direction of the reflecting mirror 2538 are changed according to the type of the probe chip mounted on the probe chip holding mechanism 2550. To do this, as shown in FIG. 11B, a mirror holding mechanism 2610 for the usual probe chip 2580 and a mirror holding mechanism 2640 for the goose probe chip 2590 are prepared separately. These are selectively installed on the terminal member 2520 of the piezoelectric actuator 2510.

A mirror holding mechanism 2610 has a reflecting mirror 2612. The reflecting mirror 2612 is provided on the body 2614. The body 2614 has a penetration 2616. A positioning pin 2522 is formed at the terminal member 2520 of the piezoelectric actuator 2510. When the mirror holding mechanism 2610 is installed on the terminal member 2520 of the piezoelectric actuator 2510, the positioning pin 2522 is passed through the penetration 2616 made in the body 2614 of the mirror holding mechanism 2610. The mirror holding mechanism 2610 is positioned by pressing the lower end section 2618 in which the penetration 2616 has been made and two extended sections 2620 and 2622 crossing at right angles with each other against three sides of a corner of the terminal member 2520. This determines the position and direction of the reflecting mirror 2612 as shown in FIG. 12A.

The reflecting mirror 2612 whose position and direction have been determined functions as the reflecting mirror 2538 of the aforementioned lever displacement mechanism for the usual probe chip 2580. Specifically, the measurement light from the laser 2532 of the lever displacement sensing mechanism is reflected by the reflecting mirror 2612, passes through an opening 2628 in the mirror holding mechanism 2610, and is projected on the cantilever 2584 of the usual probe chip 2580. The reflected light from the cantilever 2584 passes through the opening 2628, is reflected by the reflecting mirror 2612, and advances toward the photodetector 2540 of the lever displacement sensing mechanism.

Similarly, a mirror holding mechanism 2640 has a reflecting mirror 2642. The reflecting mirror 2642 is provided on the body 2644. The body 2644 has a penetration 2646. When the mirror holding mechanism 2640 is installed on the terminal member 2520 of the piezoelectric actuator 2510, the positioning pin 2522 is passed through the penetration 2646 made in the body 2644 of the mirror holding mechanism 2640. The mirror holding mechanism 2640 is positioned by pressing the lower end section 2648 in which the penetration 2646 has been made and two extended sections 2650 and 2652 crossing at right angles with each other against three sides of a corner of the terminal member 2520. This determines the position and direction of the reflecting mirror 2642 as shown in FIG. 12B.

The reflecting mirror 2642 whose position and direction have been determined functions as the reflecting mirror 2538 of the aforementioned lever displacement mechanism for the goose chip 2590. Specifically, the measurement light from the laser 2532 of the lever displacement sensing mechanism is reflected by the reflecting mirror 2642, passes through an opening 2658 in the mirror holding mechanism 2640, and is projected on the cantilever 2594 of the goose probe chip 2590. The reflected light from the cantilever 2594 passes through the opening 2658, is reflected by the reflecting mirror 2642, and advances toward the photodetector 2540 of the lever displacement sensing mechanism.

As described above, the instrument of the present embodiment enables installation of not only the usual probe chip 2580 but also the goose chip 2590, a new type of probe chip. With the instrument, use of the usual probe chip 2580 enables the surface roughness of the specimen extending in the directions of X and Y to be measured at high resolution. Furthermore, use of the goose chip 2590 enables the surface roughness of the specimen extending in the direction of Z to be measured at high resolution.

As seen from comparison of FIG. 12 with FIG. 12B, the usual probe chip 2580 differs from the goose chip 2590 in the angle of the cantilever extending from the support section. The conventional instrument, prevented probe chips differing in the shape from being installed thereon, whereas the instrument of the embodiment enables probe chips differing in the shape to be installed for measurement.

Specifically, the probe chips 2580 and 2590 differing in the shape are mounted on each corresponding mounting surface of the probe chip rest 2562 of the probe chip holding section 2558. Then, the mirror holding members 2610 and 2640 corresponding to the installed probe chips 2580 and 2590 are attached to the terminal member 2520 of the piezoelectric actuator 2510. This makes it possible to sense the displacement of the cantilevers of the probe chips 2580 and 2590 differing in the shape, with the light source section and sensing section of the lever displacement mechanism being used for both types of probe chip.

The mirror holding mechanisms 2610 and 2640 are positioned by pressing them against the terminal member 2603. The reliability of their installation is improved by inserting the positioning pin 2522 into the penetrations 2616 and 2646. The positioning pin 2606 prevents the mirror holding mechanisms 2610 and 2640 from coming off when unexpected impact is exerted on the instrument. While the mirror holding mechanisms 2610 and 2640 are preferably held in place by magnetic attraction for easy installation and removal, they may be held in place with screws.

In the system, most of the optical parts of the lever displacement sensing mechanism in the SPM head are in common use. This makes it possible to measure the displacement of the cantilevers of probe chips differing in the shape with a minimum change of optical parts. In FIG. 11A, just changing the position and direction of the reflecting mirror 2538 enables the remaining semiconductor laser 2532, collimator lens 2534, beam splitter 2536, and position sensing photodiode 2540 to be used without any modification.

The mirror holding mechanism for the usual probe chip and the goose chip has been thus far explained. It will be readily understood that the instrument can be applied to a probe chip where the angle between the probe and the cantilever differs from those of the above probe chips. This is done by preparing a mirror holding mechanism with the mirror arranged in the direction and position corresponding to the new probe. Specifically, as explained above, an instrument capable of dealing with a wide variety of probe chips can be provided by combining a method of installing the probe chip and the optical path adjusting mechanism for the optical-lever displacement sensor for sensing the displacement of the cantilever and selecting the probe chip mounting surface and the optical path adjusting mechanism corresponding to the mounting surface.

As shown in FIG. 12B, when the goose chip 2590 is mounted on the probe chip holding mechanism 2550, the direction normal to the plane of the probe section 2596 is perpendicular to the direction normal to the plane of the specimen and the ridge connecting two points at the tip of the probe section 2596 of the probe chip 2590 is held in parallel to the plane of the specimen. As a result, the tip of the probe section of the probe chip interacts with the surface of the specimen, even with the uneven portion including almost vertical sidewalls in the specimen. This makes it possible to measure and display the almost vertical sidewalls of the specimen accurately.

The measuring operation of the scanning probe microscope will be explained. AFM measurement with the configuration of FIG. 12A using the usual probe chip can be performed as in the prior art. Hereinafter, therefore, only AFM measurement with the configuration of FIG. 12B using the goose chip will be explained.

Before the surface geometry of the specimen is measured, to measure the displacement of the cantilever 2594 of the goose chip 2590, the mirror holding mechanism 2640 is provided on the terminal member 2520 so as to sense the displacement of the cantilever 2594 in the lever displacement sensing mechanism. Then, adjustments including optical axis adjustment are made in advance.

Next, to vibrate the cantilever 2594 at the mechanical resonance frequency or a frequency near the resonance frequency, the piezoelectric element 2560, an exciting mechanism, is driven at the frequency. The amplitude is set in the range from 10 nm to 100 nm with the probe being sufficiently away from the specimen. When the surface geometry of the specimen is measured, the Z-direction fine adjustment stage 2518 is adjusted so that the probe section 2596 at the tip of the cantilever 2594 of the probe chip 2590 held by the probe chip holding mechanism 2550 may come closer less than 100 nm to the portion of the specimen's surface to be measured or come in slight contact with the portion. At that time, as the probe is brought closer to the portion of the specimen's surface to be measured, the amplitude of the vibration of the cantilever 2594 set as described above decreases when the probe section starts to interact with the surface of specimen.

At the time when the amplitude signal of the vibration of the cantilever has decreased to a preset value, the probe section is caused to stop approaching the specimen. Then, the fine adjustment stage mechanism is driven in such a manner that the probe section relatively scans the specimen in the directions of X and Y. The size of the scanning area can be set arbitrarily by the control signal from the controller. Generally, the probe section scans an area in the range from 1 $nm^2$ to 300 $\mu m^2$. While the probe section is relatively scanning the specimen in the directions of X and Y, the fine adjustment stage mechanism 2518 is moved in the direction of Z so that the state of vibration of the cantilever 2594 may be stable. That is, feedback control is performed.

During the feedback control, the signal indicting the deviation of the set value (e.g., the RMS (root means square) value) representing the state of vibration of the cantilever 2594 from the actual measurement value is supplied to the computer, which displays it on the monitor in the form of a two-dimensional image or a three-dimensional image. At that time, instead of supplying the deviation signal to the computer, the driving control signal for driving the fine adjustment stage mechanism in the direction of Z is supplied to the computer, which displays it on the monitor in the form of a two-dimensional image or a three-dimensional image.

As seen from the explanation, with the instrument, because a usual probe chip suitable for measuring the roughness of the specimen's surface and a probe chip suitable for measuring the sidewalls in the specimen can be used, different types of measurement can be achieved without requiring a lot of investment in plant and equipment, achieving a high cost performance.

Another goose chip holding mechanism will be explained by reference to FIG. 13 and FIGS. 14A, 14B, and 14C.

Figure 13:
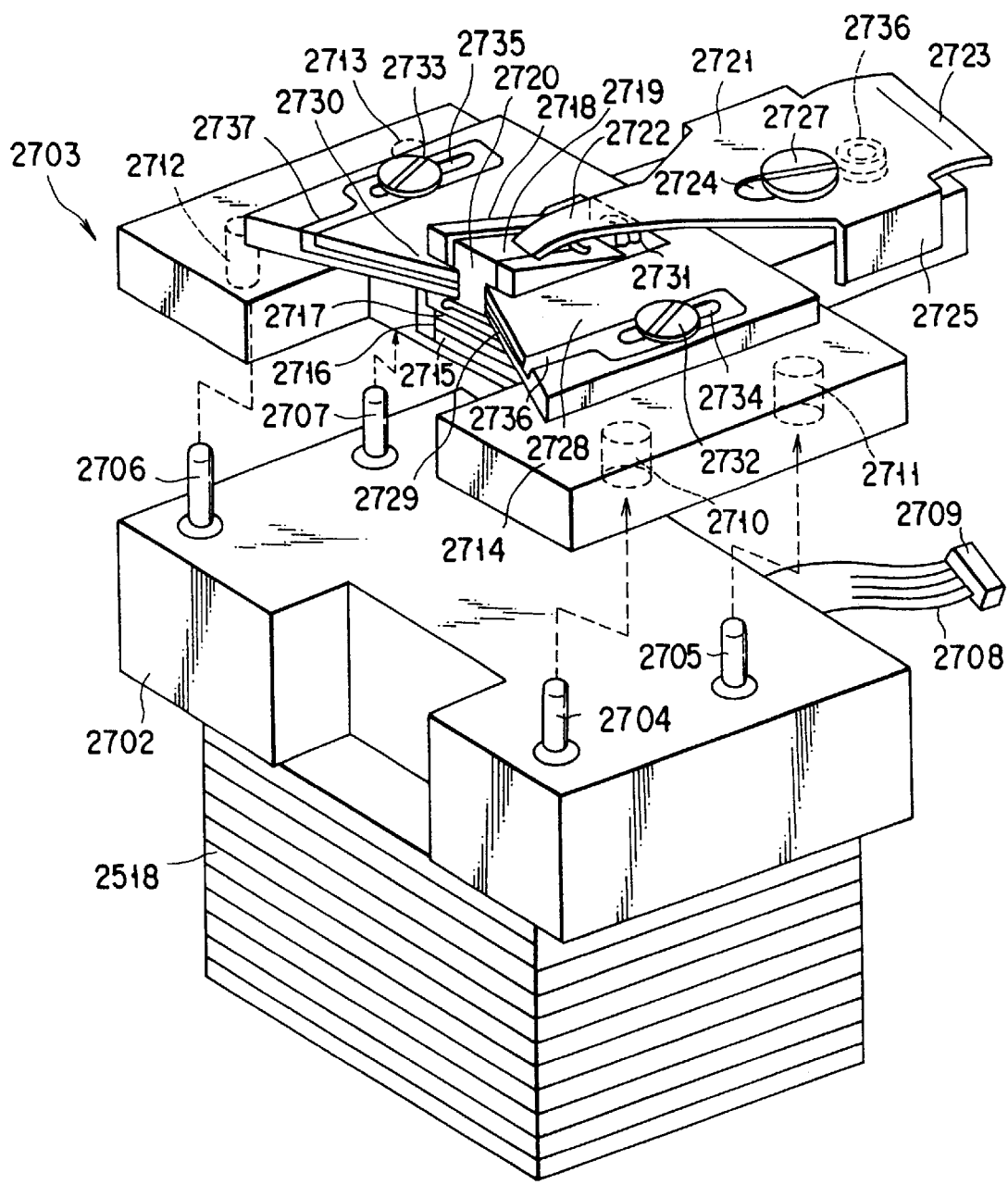
FIG. 13 is a perspective view of another probe chip holding mechanism for holding the probe chip of FIGS. 1A and 1B or the probe chip of FIG. 4.

As shown in FIG. 13, a probe chip holding structure rest 2702 is fixed to the end of a X-direction fine adjustment stage mechanism 2518 composed of a piezoelectric element. A probe chip holding structure 2703 is mounted on the probe chip holding structure rest 2702 in such a manner that the structure can be installed and removed. To secure the probe chip holding structure 2703 to the probe chip holding structure rest 2702, four fixing pins 2704, 2705, 2706, 2707 are embedded in the probe chip holding structure rest 2702. A wire 2708 and a connector 2709 that are used to connect the probe chip holding structure 2703 to an external circuit extends from the probe chip holding structure rest 2702.

The probe chip holding structure 2703 is roughly divided into a body section, a probe chip pad section, a probe chip exciting mechanism section, and a probe fixing section.

The body section is composed of a holding structure base member 2714 in which female pin rests 2710, 2711, 2712, 2713 corresponding to the fixing pins of the probe chip holding structure rest 2702 have been embedded. In the center of the holding structure base member 2714, there is provided a probe chip pad 2718 having pad surfaces 2719, 2720 to which a probe chip is attached. The probe chip pad 2718 is made of a conductive metal to determine the potential of the back of the probe chip.

The probe chip exciting mechanism section is composed of a buffer member 2715, a cantilever exciting piezoelectric element 2716, and a probe chip pad fixing plate 2717 stacked in that order on the holding structure base member 2714. The probe chip pad 2718 is stacked on the probe chip pad fixing plate 2717. To connect the piezoelectric element 2716 to an external circuit to apply a voltage to the piezoelectric element 2716, the electrodes formed on both sides of the piezoelectric element 2716 are connected to the pin rests 2711, 2713 inside the holding structure base member 2714. The pin rests 2711, 2713 come in contact with the fixing pins 2705, 2707 also serving as electrodes on the probe chip holding structure rest 2702 and are connected to an external piezoelectric element exiting circuit (not shown) via the wire 2708 and the connector 2709. The buffer member 2715 attenuates vibration as much as possible so as not to transmit the vibration of the piezoelectric element 2716 to the holding structure base member 2714. The buffer member 2715 also assures insulation between the electrode at the bottom of the piezoelectric element 2716 and the holding structure base member 2714.

Figure 14A:
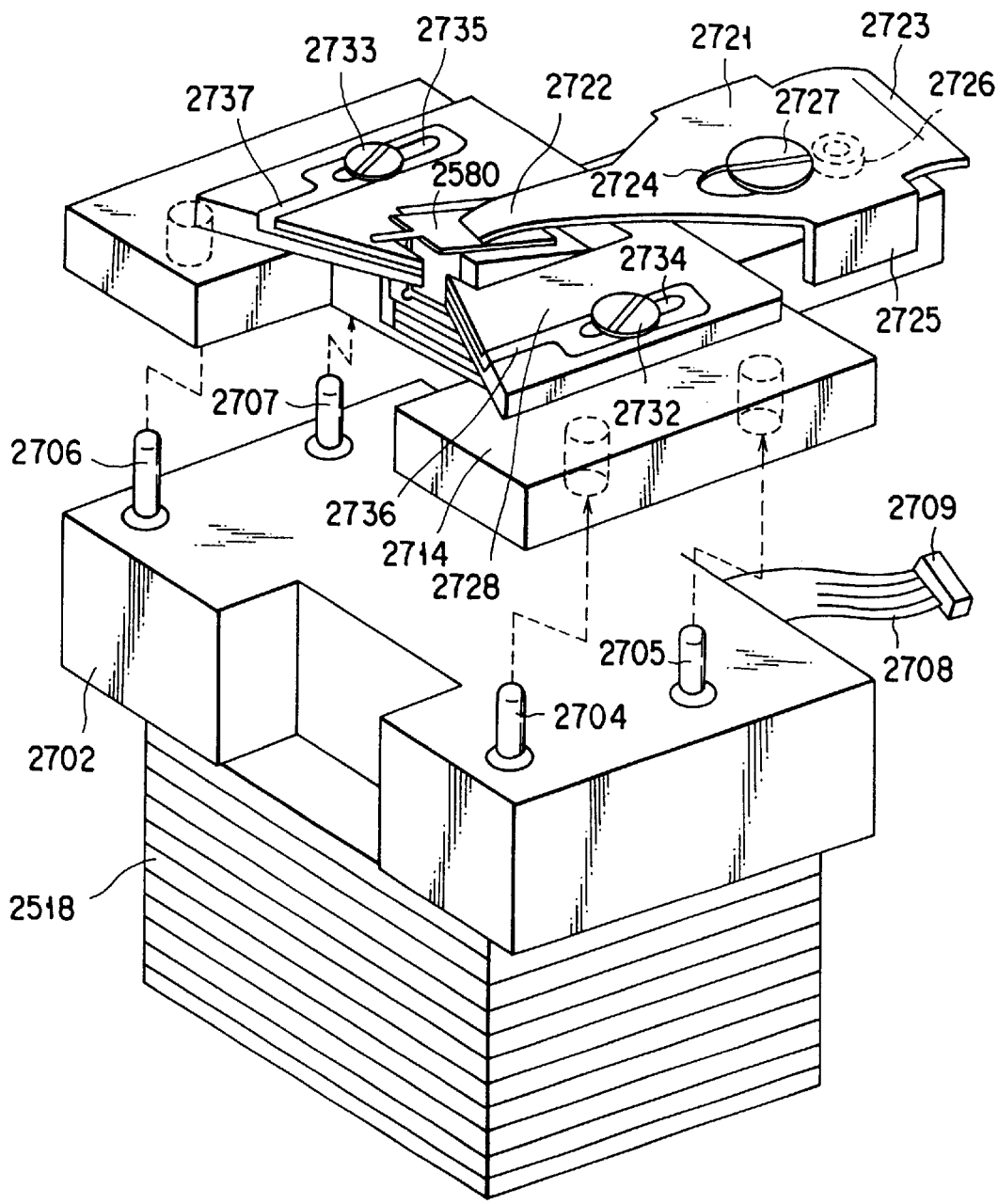
FIG. 14A is a perspective view of the probe chip holding mechanism of FIG. 13 provided with an ordinary probe chip.

The probe fixing section includes a probe chip hold-down plate spring 2721 for holding down a usual probe chip and a probe chip fitting strip 2728 for holding a goose chip. Specifically, the probe chip holding mechanism of the embodiment can selectively hold either the usual probe chip or the goose chip. FIG. 14A illustrates the probe chip holding mechanism that has held the usual probe chip, whereas FIG. 14B illustrates the probe chip holding mechanism that has held the goose chip.

As shown in FIG. 14A, the probe fixing section is provided with the probe chip hold-down plate spring 2721 for holding down a usual probe chip. A chip hold-down section 2722 is provided at one end of the probe chip hold-down plate spring 2721 and a finger hold-down margin 2723 is provided at the other end of the probe chip hold-down plate spring 2721. A screw 2727 is forced to stand straight on the holding structure base section 2714 through a long hole in the middle of the probe chip hold-down plate spring 2721 in such a manner that the probe chip hold-down plate spring 2721 can move back and forth. A lateral guide plate 2725 prevents the probe chip hold-down plate spring 2721 from turning laterally more than necessary when moving. A spring 2726 is provided not only to apply the necessary spring pressure when the probe chip is held down by the chip hold-down section 2722 at the tip of the probe chip hold-down plate spring 2721 but also to produce suitable repulsion force when the finger hold-down margin 2723 is pressed with a finger. The probe chip hold-down plate spring 2721 is electrically connected to the probe chip pad 2718. These two are electrically connected to the connector 2709 via the pin rest 2710 and fixing pin 2704 and are kept at the same potential as the external desired potential via the connector 2709.

Figure 14B:
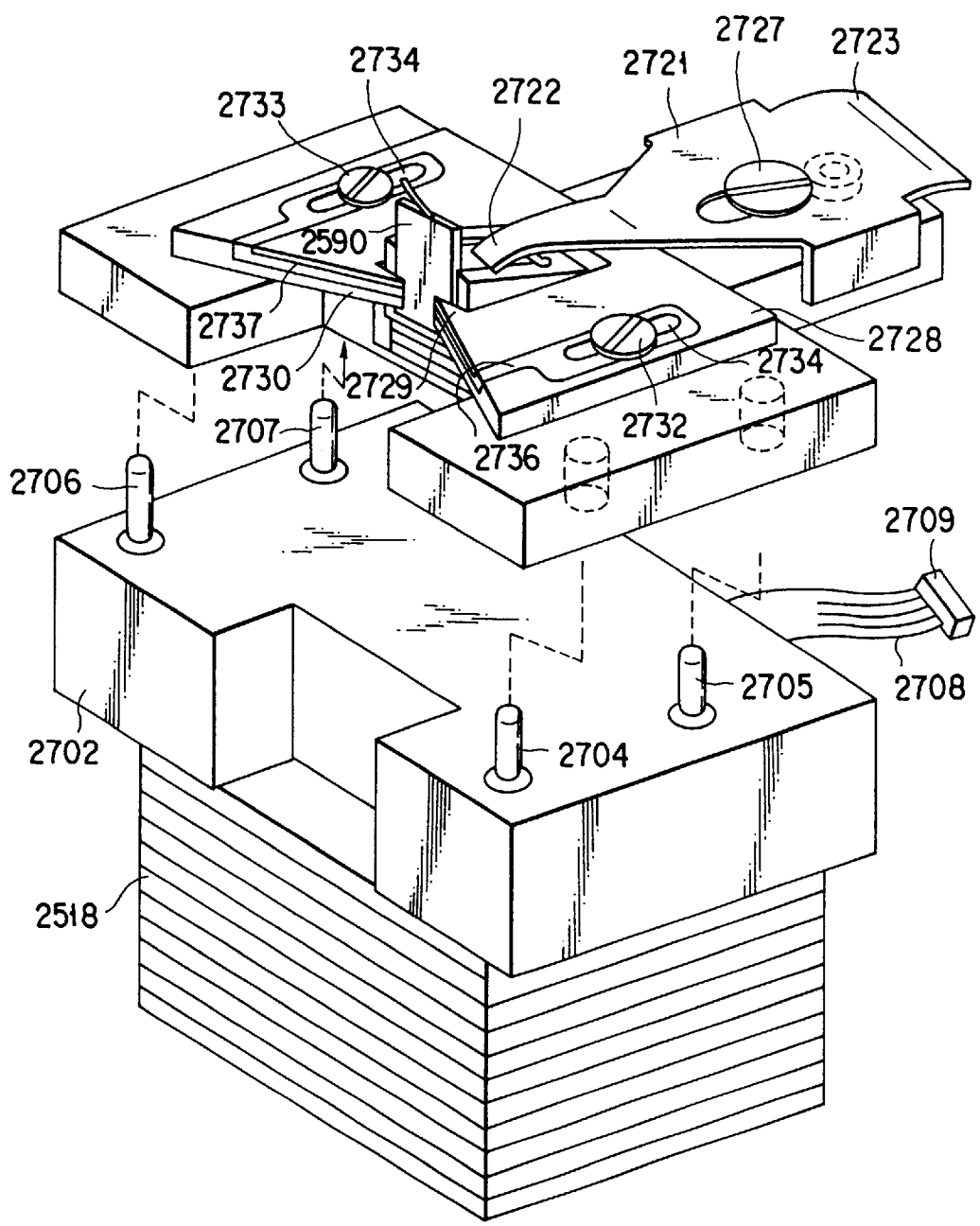
FIG. 14B is a perspective view of the probe chip holding mechanism of FIG. 13 provided with a goose chip.

As shown in FIG. 14B, the probe fixing section is provided with the probe chip fitting plate 2728 for holding the goose chip at the sides. The spring 2731, long holes 2734, 2735, and screws 2732, 2733 enables the probe chip fitting plate 2728 to slide over the holding structure base member 2714 and move back and forth. When the probe chip is installed, the probe chip hold-down sections 2729, 2730 function as a point of application and press the probe chip against the pad surface 2720 by the pressure of the spring 2731.

The probe chip fitting plate 2728 are provided with an electrode 2636 and an electrode 2737. The electrode 2736 is connected to the probe chip pad 2718 and probe chip hold-down plate spring 2721 in the holding structure base member 2714 and is kept at the same potential as that of these components. The electrode 2737 is electrically connected to the connector 2709 via the pin rest 2712 and fixing pin 2706 and can be connected to an external device via the connector 2709. These electrodes 2736 and 2737 are provided to install probe chips with cantilevers having a displacement sensing function making use of piezoelectric effect or strain resistance effect.

Figure 14C:
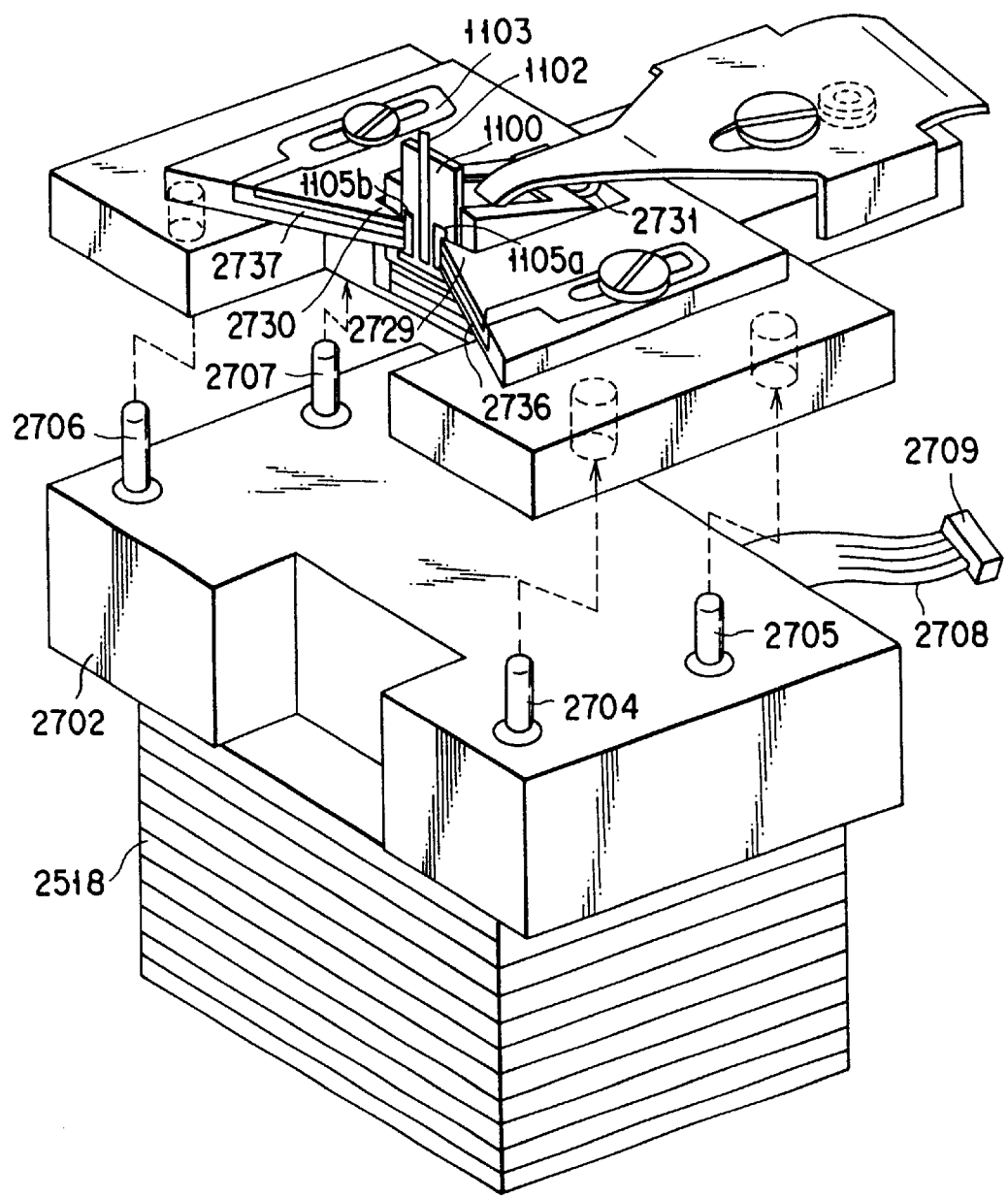
FIG. 14C is a perspective view of the probe chip holding mechanism of FIG. 13 provided with the probe chip shown in FIGS. 6A and 6B.

Specifically, the probe chip holding mechanism can be used with not only the usual probe chip and goose chip but also, as shown in FIG. 14C, with a probe chip 1100 with a cantilever having the displacement sensing function shown in FIGS. 6A and 6B As shown in FIG. 14C, the probe chip 1100 is held at its sides by the probe chip fitting plate 2728 in the same manner as the goose chip. The electrodes 2736 and 2737 are pressed against the electrode pads 1105a and 1105b respectively. As a result, the displacement sensing function section 1104 is electrically connected to the connector 2709, which allows the displacement signal from the displacement sensing function section 1104 to be drawn out via the connector 2709.

Since the probe chip incorporating the cantilever's displacement sensing function section does not require the aforementioned optical lever displacement sensing mechanism, it is not necessary to change the optical components.

Furthermore, when the probe chip holding structure 2703 is used, the holding structure itself has all of the functions excluding the probe chip 1100 in FIG. 7A. This eliminates the structure corresponding to the wire 1208, electrode pattern 1204, and piezoelectric element 1205.

The probe chip holding mechanism has the advantage that the probe chip can be installed and removed easier than the holding of a probe chip with adhesive. Use of no adhesive enables immediate use of a probe chip after the probe chip has been installed on the probe chip holding mechanism. Moreover, at the time of replacement of the probe chip, there will be no peeled adhesive and therefore no dust.

Although this probe chip holding mechanism is a little larger than the aforementioned probe chip holding mechanism, the probe chip holding structure 2703 measures about 30 mm×20 mm×8 mm, which is considerably compact.

Figure 15:
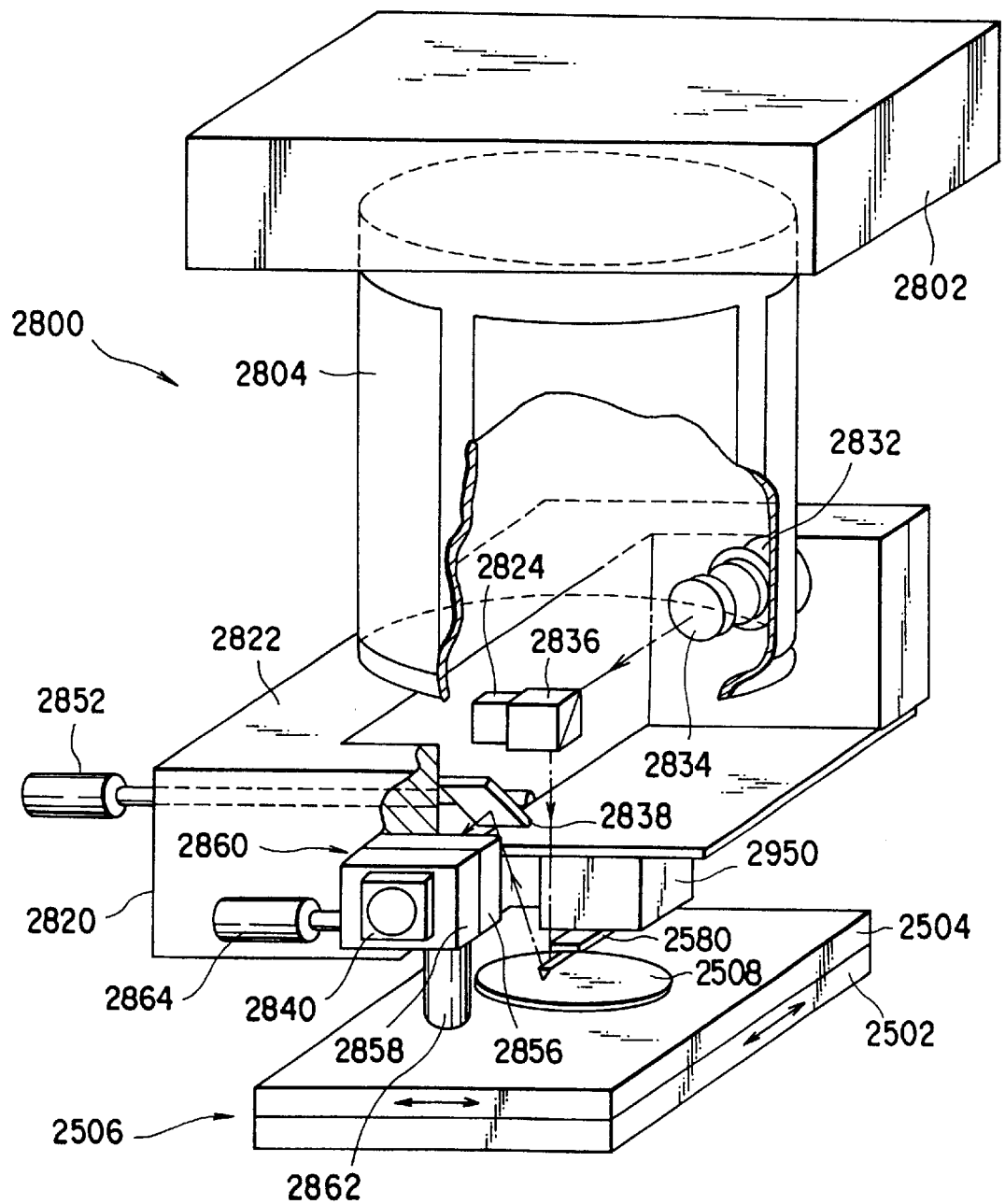
FIG. 15 is a schematic perspective view of another SPM head provided with a probe chip holding mechanism for holding the probe chip of FIGS. 1A and 1B and the probe chip of FIG. 4 suitably.

Another SPM head provided with a holding mechanism suitable for the goose chip will be described by reference to FIG. 15. The SPM head uses a cylindrical fine adjustment stage mechanism, or a piezoelectric tube scanner 2804, as a XYZ-direction fine adjustment stage mechanism. A probe chip holding mechanism 2950 can be used with both of the usual probe chip and the goose chip. FIG. 15 illustrates the probe chip holding mechanism 2950 that holds the usual probe chip 2580.

A specimen 2508 to be measured is placed on an XY stage 2506 provided with an X stage 2502 and a Y stage 2504 both capable of coarse adjustment in the directions of X and Y crossing at right angles with each other. Above the specimen 2508, an SPM head 2800 is positioned. The SPM head 2800 is provided on a Z stage 2802 capable of coarse adjustment in the direction of Z. The coarse adjustment XY stage 2506 and Z stage are secured to a housing or a base member (not shown) at their mounting sites. The SPM instrument is usually placed on a vibration damper to make it difficult for external vibration to reach the measurement site (the vicinity of the specimen).

The SPM head 2800 includes a cylindrical fine adjustment stage mechanism 2804 secured to the Z stage 2802, a lever displacement sensing mechanism 2820 provided at the lower end of the stage mechanism 2802, and a probe chip holding mechanism 2950 provided at the bottom of the sensing mechanism 2820.

The cylindrical fine adjustment stage mechanism 2804 is composed of, for example, a piezoelectric tube scanner. A probe chip is mounted on the probe chip holding mechanism 2950 and moved in the directions of X, Y, and Z by the piezoelectric tube scanner 2804. Namely, the piezoelectric tube scanner 2804 enables the fine adjustment and scanning of the probe chip in the directions of X, Y, and Z.

The lever displacement sensing mechanism 2820 has an optical lever displacement sensing mechanism for optically sensing the displacement of the cantilever of the probe chip. The sensing mechanism 2820 includes a semiconductor laser 2832, a collimator lens 2834, a mirror 2836, a reflecting mirror 2838, and a position sensing photodiode 2840. In the figure, the dot-dash line represents the optical path of the light beam from the optical lever displacement sensing mechanism.

The semiconductor laser 2832 and collimator lens 2834 are provided on the housing 2822 of the lever displacement sensing mechanism 2820. The mirror 2836 is provided on the housing 2822 via a mirror fixing member 2824.

The mirror 2838 is supported by the housing 2822 in such a manner that the mirror can rotate. The direction of the mirror 2838 can be adjusted by an angle adjustment control 2852. The position sensing photodetector 2840 is provided on the housing 2822 via a YZ stage 2860 provided with a Y-direction position adjustment stage 2856 and a Z-direction position adjustment stage 2858. The position of the position sensing photodetector 2840 can be adjusted by two adjustment controls 2862 and 2864.

Figure 16A:
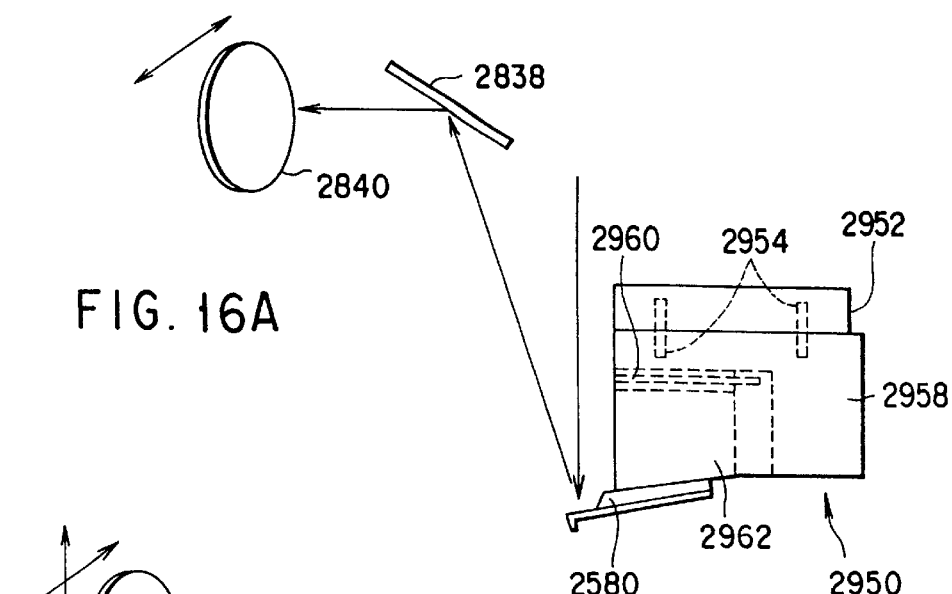
FIG. 16A is a side view of the probe chip of FIG. 15 provided with a usual probe chip.
Figure 16B:
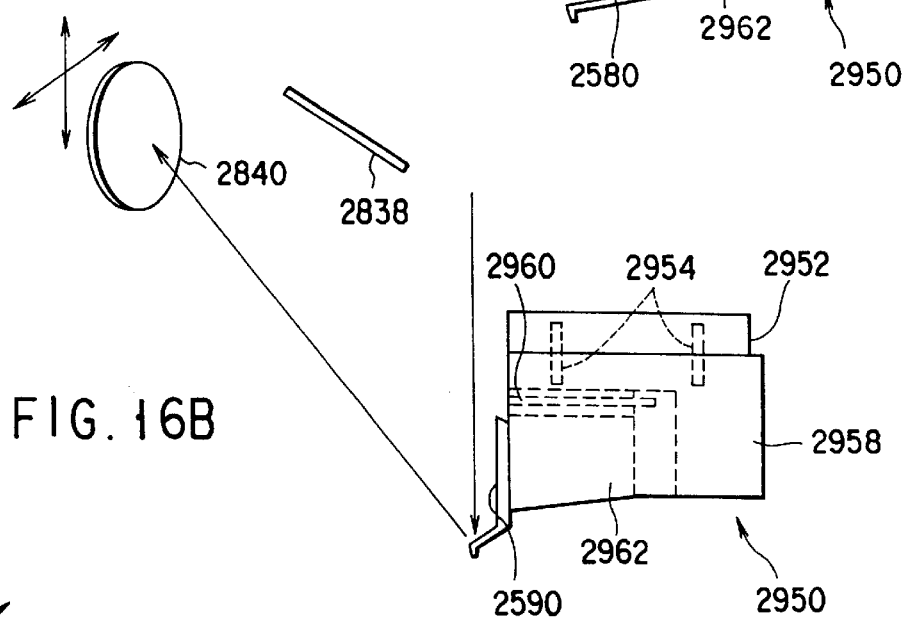
FIG. 16B is a side view of the probe chip holding mechanism of FIG. 15 provided with a goose chip.
Figure 16C:
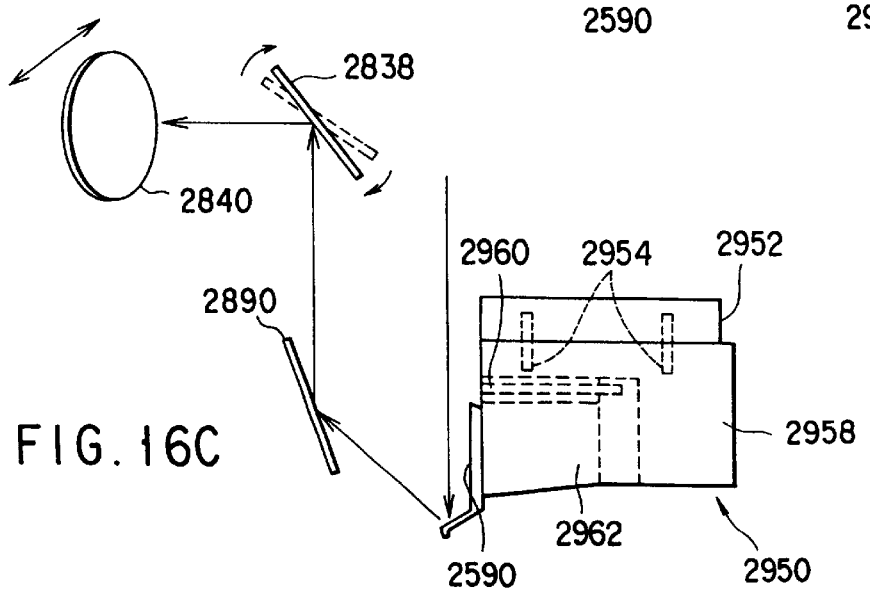
FIG. 16C is a side view of the probe chip holding mechanism of FIG. 15 provided with a goose chip, with an improved lever displacement sensing mechanism.

FIGS. 16A, 16B, and 16C show the periphery of the probe chip holding mechanism 2950 of the embodiment and part of the lever displacement sensing mechanism together with the optical path. FIG. 16A illustrates the probe chip holding mechanism 2950 on which a usual probe chip 2580 has been installed. FIGS. 16B and 16C illustrate the probe chip holding mechanism 2950 on which a goose chip 2590 has been installed.

As shown in FIGS. 16A, 16B, and 16C, the probe chip holding mechanism 2950 of the embodiment includes a probe chip holding structure rest 2952 provided on the lever displacement sensing mechanism section 2820. A probe chip holding section 2958 is provided on the probe chip holding structure rest 2952 with a fixing pin 2954. The probe chip holding section 2958 has a probe chip pad 2962 to which the probe chip is secured.

As shown in FIG. 16A, the usual probe chip 2580 has its support section attached to the bottom surface of the probe chip pad 2962 with adhesive or the like. As shown in FIGS. 16B and 16C, the goose chip 2590 has its support section attached to the side face of the probe chip pad 2962 with adhesive or the like. Inside the probe chip holding section 2958, there is provided a piezoelectric element 2960 for exciting the goose chip 2590 attached thereto.

In the case of the usual probe chip 2580, after the light emitted from the semiconductor laser 2832 has passed through the collimator lens 2834, it is reflected by the mirror 2836 and enters the cantilever of the probe chip 2580 as shown in FIG. 16A. The reflected light from the cantilever is deflected by the reflecting mirror 2838 and enters the position sensing photodiode 2840.

The reflected light from the cantilever is positioned so as to strike almost the center of the position sensing photodetector 2840. This is done by adjusting the flap angle of the mirror 2838 by use of the angle adjusting control 2852 and the lateral (Y-direction) movement of the position sensing photodetector 2840 by use of the Y-direction position adjustment stage 2856.

In the case of the goose chip 2590, after the light emitted from the semiconductor laser 2832 has passed through the collimator lens 2834, it is reflected by the mirror 2836 and enters the cantilever of the goose chip 2590 as shown in FIG. 16B. The reflected light from the cantilever directly enters the position sensing photodiode 2840.

The positioning of the position sensing photodetector 2840 is achieved by adjusting the longitudinal and traverse movements (the movement in the directions of Y and Z) of the position sensing photodetector 2840 by use of the YZ stage 2860.

The configuration of FIG. 16B has a shorter optical path of the reflected light than that of FIG. 16A and therefore the optical lever displacement sensor has a lower displacement sensitivity. When such a decrease in the sensitivity cannot be ignored, another reflecting mirror 2890 should be used as shown in FIG. 16C. The mirror 2890 causes the reflected light to advance by way of the reflecting mirror 2838 and enter the position sensing photodetector 2840 to length the optical path length. In this case, the positioning of the position sensing photodetector 2840 is achieved by adjusting the flap angle of the reflecting mirror 2838 or the reflecting mirror 2890 and the longitudinal movement (the movement in the direction of Z) of the position sensing photodetector 2840.

Additional advantages and modifications will readily occur to those skilled in the art. Therefore, the invention in its broader aspects is not limited to the specific details, and representative devices and methods shown and described herein. Accordingly, various modifications may be made without departing from the spirit or scope of the general inventive concept as defined by the appended claims and their equivalents.

What is claimed is:

1. A scanning probe microscope probe chip, comprising:
   a support section;
   a cantilever-like elastic member section supported by said support section; and
   a probe section provided at a free end of said elastic member section,
   wherein said probe section has a triangular flat plate shape, and
   wherein two terminal points at a tip of said probe section act as points of application to a specimen to be measured.

2. A scanning probe microscope probe chip according to claim 1, wherein a point on a ridge connecting the two terminal points acts as a point of application to the specimen to be measured.

3. A scanning probe microscope probe chip according to claim 1, wherein a direction normal to a plane of said probe section is almost parallel to a ridge connecting the two terminal points at the tip of said probe section.

4. A scanning probe microscope probe chip according to claim 1, wherein a direction normal to a plane of said probe section is almost parallel to a direction normal to a plane of said support section.

5. A scanning probe microscope probe chip according to claim 4, wherein a direction normal to a plane of said elastic member section is almost parallel to the direction normal to the plane of said probe section.

6. A scanning probe microscope probe chip according to claim 4, wherein a direction normal to a plane of said elastic member section is nonparallel to the direction normal to the plane of said probe section.

7. A scanning probe microscope probe chip according to claim 1, wherein said elastic member section is thicker than said probe section.

8. A scanning probe microscope probe chip according to claim 1, wherein a direction normal to a plane of said elastic member section is almost parallel to a direction normal to a plane of said probe section.

9. A scanning probe microscope probe chip according to claim 1, wherein a direction normal to a plane of said elastic member section is nonparallel to a direction normal to a plane of said probe section.

10. A scanning probe microscope probe chip according to claim 1, further comprising a sensing mechanism that senses a displacement of the elastic member section.

11. A scanning probe microscope probe chip according to claim 10, wherein said sensing mechanism comprises a sensor that senses a piezoelectric strain resistance effect.

12. A scanning probe microscope probe chip according to claim 10, wherein said sensing mechanism comprises a sensor that senses a piezoelectric effect.

13. A scanning probe microscope probe chip according to claim 10, wherein a direction normal to a plane of said elastic member section is parallel to a direction normal to a plane of said probe section.

14. A scanning probe microscope probe chip according to claim 1, wherein said scanning probe microscope probe chip is manufactured through semiconductor processes.

15. A scanning probe microscope probe chip according to claim 14, wherein said probe section is made of a silicon compound.

16. A scanning probe microscope probe chip according to claim 14, wherein said probe section is made of amorphous carbon.

17. A scanning probe microscope comprising:
   a probe chip including a support section, a cantilever-like elastic member section supported by said support section, and a probe section having a triangular flat plate shape provided at a free end of said elastic member section;
   a probe chip holding mechanism that holds said probe chip in such a manner that a line normal to a plane of said probe section is substantially perpendicular to a line normal to an average plane of a specimen;
   a vibrating mechanism that vibrates said probe chip to obtain a virtual probe with vertexes;
   a vibration sensing mechanism that senses a change in a state of vibration of said elastic member section based on an interaction between a surface of said specimen and one of the vertexes of said virtual probe;
   a driving mechanism that relatively drives said virtual probe and the surface of said specimen in a three-dimensional direction;
   a control circuit that controls said driving mechanism according to information from said vibration sensing mechanism in such a manner that the interaction between the surface of said specimen and said virtual probe is kept constant; and
   an information processing circuit that obtains information on unevenness of the surface of said specimen based on a control signal from said control circuit.

18. A scanning probe microscope according to claim 17, wherein said probe chip held by said probe chip holding mechanism is formed such that the line normal to the plane of said probe section is parallel to a line normal to a plane of said support section and a line normal to a plane of said elastic member section is nonparallel to the line normal to the plane of said support section.

19. A scanning probe microscope according to claim 17, wherein said probe chip held by said probe chip holding mechanism is formed such that the line normal to the plane of said probe section, a line normal to a plane of said elastic member section, and a line normal to a plane of said support section are all parallel to each other.

20. A scanning probe microscope according to claim 17, wherein said probe chip holding mechanism is adapted to also hold another probe chip that differs from said probe chip whose probe section has a triangular flat plate shape.

21. A scanning probe microscope according to claim 20, wherein said another probe chip comprises a conical probe section at a tip of an elastic member section extending from a support section, and an axis of the probe section of said another probe chip, a line normal to a plane of the elastic member section of said another probe chip, and a line normal to a plane of the support section of said another probe chip are all parallel to each other.

22. A scanning probe microscope according to claim 21, wherein said probe chip holding mechanism comprises a first mounting surface for said probe chip and a second mounting surface for said another probe chip.

23. A scanning probe microscope according to claim 22, wherein said probe chip holding mechanism includes a first mechanism that fixes said probe chip to the first mounting surface by force of a spring, and a second mechanism that fixes said another probe chip to the second mounting surface by force of a spring.

24. A scanning probe microscope according to claim 22, wherein said vibration sensing mechanism comprises an optical sensor that optically senses a vibration of said elastic member section, and the optical sensor includes a mechanism that switches an optical path according to which of said probe chip and said another probe chip is mounted.

25. A scanning probe microscope according to claim 17, wherein said probe chip is formed integrally with said vibration sensing mechanism and outputs an electric signal corresponding to the state of vibration of said elastic member section, and the outputted electric signal is inputted to said control circuit via said probe holding mechanism.

26. A scanning probe microscope according to claim 17, wherein said probe chip holding mechanism is integrally formed with said vibrating mechanism.

27. A scanning probe microscope according to claim 17, wherein said probe chip holding mechanism is adapted to be installed on and removed from said microscope.

28. A scanning probe microscope according to claim 17, wherein said vibration sensing mechanism comprises an optical sensor that optically senses a displacement of said elastic member section.

* * * * *